US012607161B2

(12) United States Patent
Voronetskyi et al.

(10) Patent No.: US 12,607,161 B2
(45) Date of Patent: Apr. 21, 2026

(54) HYDRAULIC TURBINE

(71) Applicant: Innovix, LLC, Provo, UT (US)

(72) Inventors: Oleksandr Voronetskyi, Provo, UT (US); Vasyl Afanasiev, Provo, UT (US)

(73) Assignee: Innovix, LLC, Provo, UT (US)

( * ) Notice: Subject to any disclaimer, the term of this patent is extended or adjusted under 35 U.S.C. 154(b) by 0 days.

(21) Appl. No.: 19/210,139

(22) Filed: May 16, 2025

(65) Prior Publication Data

US 2025/0361848 A1 Nov. 27, 2025

Related U.S. Application Data

(60) Provisional application No. 63/650,784, filed on May 22, 2024.

(51) Int. Cl.
*F03B 13/08* (2006.01)
*F15B 1/04* (2006.01)
(Continued)

(52) U.S. Cl.
CPC ................ *F03B 13/08* (2013.01); *F15B 1/04* (2013.01); *F15B 1/265* (2013.01); *H02K 7/1823* (2013.01); *F05B 2220/706* (2013.01)

(58) Field of Classification Search
CPC . F03B 13/08; F15B 1/04; F15B 1/265; H02K 7/1823; F05B 2220/706
(Continued)

(56) References Cited

U.S. PATENT DOCUMENTS 3,013,663 A * 12/1961 Vane ...................... B03B 5/626
209/133
5,167,483 A * 12/1992 Gardiner ................... F03B 1/00
415/908
(Continued)

FOREIGN PATENT DOCUMENTS

CA 2861683 A1 3/2016
DE 202017004975 U1 5/2018
(Continued)

OTHER PUBLICATIONS

International Search Report and Written Opinion for International Application No. PCT/US2025/030025 mailed Jul. 8, 2025 (17 pages).

*Primary Examiner* — Charles Reid, Jr.
(74) *Attorney, Agent, or Firm* — Ray Quinney & Nebeker P.C.; James S. Bullough

(57) ABSTRACT

A hydraulic turbine includes a hydraulic drive and a hydraulic accumulator. Fluid from a supply tank is pumped into the hydraulic drive through a supply pipe. The fluid flow into a fluid reservoir of the hydraulic accumulator through a flow amplifier of the hydraulic accumulator. The flow amplifier rotates within the fluid reservoir to generate a vortex of the fluid within the fluid reservoir, thereby generating a pressurized flow of the fluid. The pressurized flow of the fluid flows from the hydraulic accumulator through one or more helical pipes of the hydraulic drive. Baffles within the helical pipes redirect the pressurized flow as it flows through the hydraulic drive, thereby applying a force to the helical pipes and imparting rotational motion to the hydraulic drive. The hydraulic drive is coupled to a generator for converting the rotation of the hydraulic drive to an electrical energy output.

19 Claims, 10 Drawing Sheets

(51) Int. Cl.
    *F15B 1/26*             (2006.01)
    *H02K 7/18*          (2006.01)

(58) Field of Classification Search
    USPC ...................................................... 290/43, 54
    See application file for complete search history.

(56)             References Cited

U.S. PATENT DOCUMENTS

| | | | | |
|---|---|---|---|---|
| 5,770,893 | A * | 6/1998 | Youlton | F03B 13/24 |
| | | | | 60/497 |
| 6,355,988 | B1 * | 3/2002 | Maple | F03B 17/005 |
| | | | | 40/406 |
| 8,890,352 | B2 * | 11/2014 | McMinn | F03B 17/06 |
| | | | | 60/445 |
| 2003/0201645 | A1 * | 10/2003 | Pacheco | F03D 9/25 |
| | | | | 290/54 |
| 2007/0065272 | A1 * | 3/2007 | Maple | F03B 17/005 |
| | | | | 415/3.1 |
| 2011/0254276 | A1 * | 10/2011 | Anderson, Jr. | F03B 17/061 |
| | | | | 416/176 |
| 2012/0242088 | A1 | 9/2012 | Raz et al. | |
| 2014/0103659 | A1 * | 4/2014 | Priovolos | F01D 15/08 |
| | | | | 290/52 |
| 2014/0319840 | A1 | 10/2014 | Lu | |
| 2015/0037134 | A1 | 2/2015 | Isaev | |
| 2017/0163124 | A1 | 6/2017 | Baek et al. | |
| 2019/0305558 | A1 * | 10/2019 | Abaitancei | F16H 61/4096 |
| 2019/0345909 | A1 | 11/2019 | Safty | |
| 2020/0232488 | A1 * | 7/2020 | Hijikata | F15B 11/17 |
| 2022/0010763 | A1 | 1/2022 | Von Bargen | |
| 2022/0213860 | A1 * | 7/2022 | Kim | F03B 3/04 |
| 2022/0364507 | A1 | 11/2022 | Lawson | |

FOREIGN PATENT DOCUMENTS

| | | | | |
|---|---|---|---|---|
| FR | 2664329 | A1 | 1/1992 | |
| JP | 2004116505 | A | 4/2004 | |
| JP | 2021014739 | A | 2/2021 | |
| KR | 20020090072 | A | 11/2002 | |
| KR | 20030088105 | A | 11/2003 | |
| KR | 20130013663 | A | 2/2013 | |
| KR | 20140024198 | A | 2/2014 | |
| RU | 2064079 | C1 | 7/1996 | |
| RU | 2012139387 | A | 3/2014 | |
| RU | 2622685 | C1 * | 6/2017 | |
| RU | 2659874 | C1 | 7/2018 | |
| RU | 185646 | U1 | 12/2018 | |
| WO | 2005124148 | A1 | 12/2005 | |
| WO | 2013144610 | A2 | 10/2013 | |
| WO | 2013168865 | A1 | 11/2013 | |
| WO | WO-2020251835 | A1 * | 12/2020 | F03B 13/20 |

* cited by examiner

FIG. 1

HYDRAULIC TURBINE

CROSS REFERENCE TO RELATED APPLICATIONS

This application claims benefit and priority to U.S. Provisional Application No. 63/650,784, filed on May 22, 2024, the entirety of which is incorporated herein by reference

BACKGROUND OF THE DISCLOSURE

Electrical energy is essential for powering the world's modern and ever-expanding infrastructures. Electrical energy is generated in a variety of different ways and for myriad purposes. Technologies for a more efficient production of electricity, such as those described herein, may be beneficial for the clean, renewable, and sustainable production of electrical energy.

SUMMARY OF THE INVENTION

One or more embodiments of the following disclosure relate to a hydraulic turbine for generating electrical power based on a flow of a fluid. The hydraulic turbine may include a hydraulic drive including at least one helical pipe configured for a pressurized flow of the fluid to flow through the at least one helical pipe and impart rotational motion to the hydraulic drive. The hydraulic turbine may additionally include a hydraulic accumulator positioned at an upper portion of the hydraulic turbine, the hydraulic accumulator including a fluid reservoir and a flow amplifier configured to rotate within the fluid reservoir to generate the pressurized flow within the fluid reservoir from a supply flow of the fluid provided to the fluid reservoir. The hydraulic turbine may additionally include a supply tank positioned at a base of the hydraulic turbine and a supply pipe configured to provide the supply flow to the hydraulic accumulator.

In one or more embodiments, the hydraulic drive includes four helical pipes. In one or more embodiments, the supply pipe is positioned at a rotational axis of the hydraulic drive. In one or more embodiments, the fluid reservoir of the hydraulic accumulator is connected to the hydraulic drive. In one or more embodiments, the hydraulic drive is configured to rotate at about twenty-four rotations per minute (RPM). In one or more embodiments, the flow amplifier is configured to rotate at about four hundred twenty rotations per minute (RPM) within the fluid reservoir.

In one or more embodiments, the hydraulic drive includes a support structure for supporting the hydraulic drive, wherein the hydraulic drive is connected to the support structure through one or more bearings connected to a bottom surface of the hydraulic drive. In one or more embodiments, the hydraulic accumulator is connected to the support structure through one or more additional bearings. In one or more embodiments, the support structure includes a stator positioned around the hydraulic drive, and the hydraulic drive includes an armature positioned within the stator and configured to rotate within the stator to generate electricity.

In one or more embodiments, the hydraulic drive is connected to the support structure via one or more bearings positioned on its lower surface. In some cases, the hydraulic accumulator is mounted on the hydraulic drive and is not connected to the support structure via dedicated bearings. The hydraulic accumulator may be hydraulically connected to the helical pipes of the hydraulic drive through the Bernoulli effect, which ensures fluid is supplied to the hydraulic drive with the necessary flow rate and pressure for the efficient operation of the hydraulic drive. The flow amplifier may be fixed to the output shaft of a reduction gearbox. This flow amplifier is positioned within the hydraulic accumulator. Due to the Bernoulli effect and the difference in rotational speeds between the flow amplifier and the hydraulic drive, the system maintains a stable and sufficient fluid flow rate and pressure required to generate torque.

In one or more embodiments, the hydraulic drive is positioned over the supply tank such that an outlet of the at least one helical pipe is configured to conduct the fluid from within the at least one helical pipe to the fluid reservoir. In one or more embodiments, the supply pipe includes a supply pump for pumping the supply flow from the supply tank, through the supply pipe, and to the fluid reservoir of the hydraulic accumulator. In one or more embodiments, the hydraulic turbine includes a supply motor for driving the rotation of the flow amplifier.

In one or more embodiments, the hydraulic drive includes an electrical generator rotationally coupled to the hydraulic drive for generating electricity based on the rotational motion of the hydraulic drive. In one or more embodiments, the supply tank includes a static impeller positioned around a perimeter of the supply tank. In one or more embodiments, the at least one helical pipe is configured to flow a working amount of the fluid within the at least one helical pipe that is at least 20 times more than an input amount of the fluid to the at least one helical pipe.

In addition, one or more embodiments of the following disclosure relate to hydraulic drive for rotating based on a flow of fluid. The hydraulic drive may include at least one helical pipe having an angle from 14° to 16° from horizontal. The hydraulic drive may additionally include an inlet at a top of the at least one helical pipe for receiving the flow of fluid. The hydraulic drive may further include an outlet at a bottom of the at least one helical pipe for flowing the flow of fluid out of the at least one helical pipe. The hydraulic drive may further include a baffle positioned within the at least one helical pipe configured to change a direction of the flow of fluid within the at least one helical pipe to impart a rotational motion of the hydraulic drive.

In one or more embodiments, the baffle includes a spiral flighting positioned within the at least one helical pipe. In one or more embodiments, the at least one helical pipe is in the shape of a helical cone. In one or more embodiments, the hydraulic drive includes four helical pipes positioned as a quadruple helix. In one or more embodiments, the outlet is directed in a direction that is approximately opposite a direction of the rotation of the hydraulic drive in order for the flow of fluid to flow out of the at least one helical pipe at least somewhat opposite the direction of rotation of the hydraulic drive to impart at least some rotational motion to the hydraulic drive. In one or more embodiments, the outlet is directed at least somewhat in a downward direction in order for the flow of fluid to flow out of the at least one helical pipe to apply an upward force on the hydraulic drive. In one or more embodiments, the outlet includes a nozzle or a jet.

In addition, one or more embodiments of the following disclosure relate to a hydraulic accumulator for generating a pressurized flow of a fluid. In one or more embodiments, the hydraulic accumulator includes a fluid reservoir and a flow amplifier connected to a supply pipe and configured to rotate within the fluid reservoir to generate the pressurized flow. The hydraulic accumulator may further include a supply motor for driving a rotation of the flow amplifier. The hydraulic accumulator may further include an outlet at a base of the fluid reservoir configured to flow the pressurized flow of the fluid out of the fluid reservoir.

In one or more embodiments, the flow amplifier includes at least one amplifier pipe connected to the supply pipe. In one or more embodiments, the at least one amplifier pipe is configured to flow a supply flow of the fluid from the supply pipe and into the fluid reservoir while the flow amplifier is rotating. In one or more embodiments, the at least one amplifier pipe is curved in a direction of rotation of the flow amplifier. In one or more embodiments, the at least one amplifier pipe is angled downward. In one or more embodiments, the at least one amplifier pipe is in the shape of a conical helix.

In one or more embodiments, the flow amplifier is configured to rotate within the fluid reservoir to generate a vortex within the fluid reservoir when the fluid reservoir is at least partially filled with the fluid. In one or more embodiments, the flow amplifier includes four amplifier pipes. In one or more embodiments, the flow amplifier is connected to a supply pump of the supply pipe to pump a supply of the fluid up the supply pipe and into the flow amplifier. In one or more embodiments, the supply pump is positioned below the hydraulic accumulator. In one or more embodiments, the fluid reservoir is conical. In one or more embodiments, the outlet is oriented at an acute angle from a direction of rotation of the flow amplifier.

Additionally, one or more configurations of the present disclosure relate to a hydraulic drive system designed to produce rotational motion based on fluid flow. The hydraulic drive may include at least one helical pipe oriented at an angle between 14° and 16° relative to the horizontal. The lower part of the hydraulic accumulator is connected by flanges to the upper portion of the at least one helical pipe, forming an integrated rotational mechanism. The lower part of the at least one helical pipe functions as part of a reactive-support mechanism. Furthermore, the hydraulic drive may include a baffle positioned within the at least one helical pipe, configured to redirect the flow of fluid inside the at least one helical pipe in order to generate rotational motion within the hydraulic drive. The baffle may be configured as a helical impeller that interacts with the fluid flow in such a way that, as the direction of the flow changes while passing through the impeller, the flow transfers its energy to the housing of the hydraulic drive without reducing the overall fluid throughput. The inertial forces generated within the flow are transmitted to the housing, contributing to an increase in torque at the generator shaft. Additionally, the outlet of the at least one helical pipe may be turned at an angle of 180 degrees and directed toward stator blades in a fluid tank. Due to the reactive force of the exiting fluid jet acting on the stator blades at a defined distance from the center of rotation, additional torque may be generated. This reactive force, resulting from the velocity of the outgoing flow and its distance from the axis of rotation, enhances the overall rotational motion, thereby producing substantial torque at the generator shaft.

Furthermore, one or more embodiments of the following disclosure relate to a method of operating a hydraulic turbine. The method may include pumping a supply flow of a fluid from a supply tank to a hydraulic accumulator through a supply pipe. The method may further include flowing the supply flow from a flow amplifier of the hydraulic accumulator to a fluid reservoir of the hydraulic accumulator. The method may further include creating a vortex of the fluid within the fluid reservoir based on rotating the flow amplifier to generate a pressurized flow of the fluid. The method may further include flowing the pressurized flow through a plurality of turns of a helical pipe of a hydraulic drive. The method may further include causing the hydraulic drive to rotate based on the pressurized flow of the fluid flowing through the hydraulic drive.

In one or more embodiments, the method includes flowing the pressurized flow through an outlet of the helical pipe in a direction that is at least somewhat opposite a direction of rotation of the hydraulic drive to further cause the hydraulic drive to rotate. In one or more embodiments, the supply flow is pumped to the hydraulic accumulator through the supply pipe by a supply pump of the supply pipe, and wherein the supply pump is driven based on rotating the flow amplifier. In one or more embodiments, flowing the pressurized flow through the helical pipe includes flowing the pressurized flow at a downward angle of 14° to 16° of the helical pipe.

In one or more embodiments, the method includes generating an electrical energy output based on causing the hydraulic drive to rotate. In one or more embodiments, rotating the flow amplifier includes rotating the flow amplifier at no less than three hundred twenty rotations per minute (RPM), and causing the hydraulic drive to rotate includes causing the hydraulic drive to rotate at no less than twenty-four RPM.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1 is an example of a hydraulic turbine, according to at least one embodiment of the present disclosure;

FIG. 3A-1 illustrates a side schematic view of a hydraulic turbine, according to at least one embodiment of the present disclosure;

FIG. 3A-2 illustrates another side schematic view of a hydraulic turbine, according to at least one embodiment of the present disclosure;

DETAILED DESCRIPTION

Figure 2A:
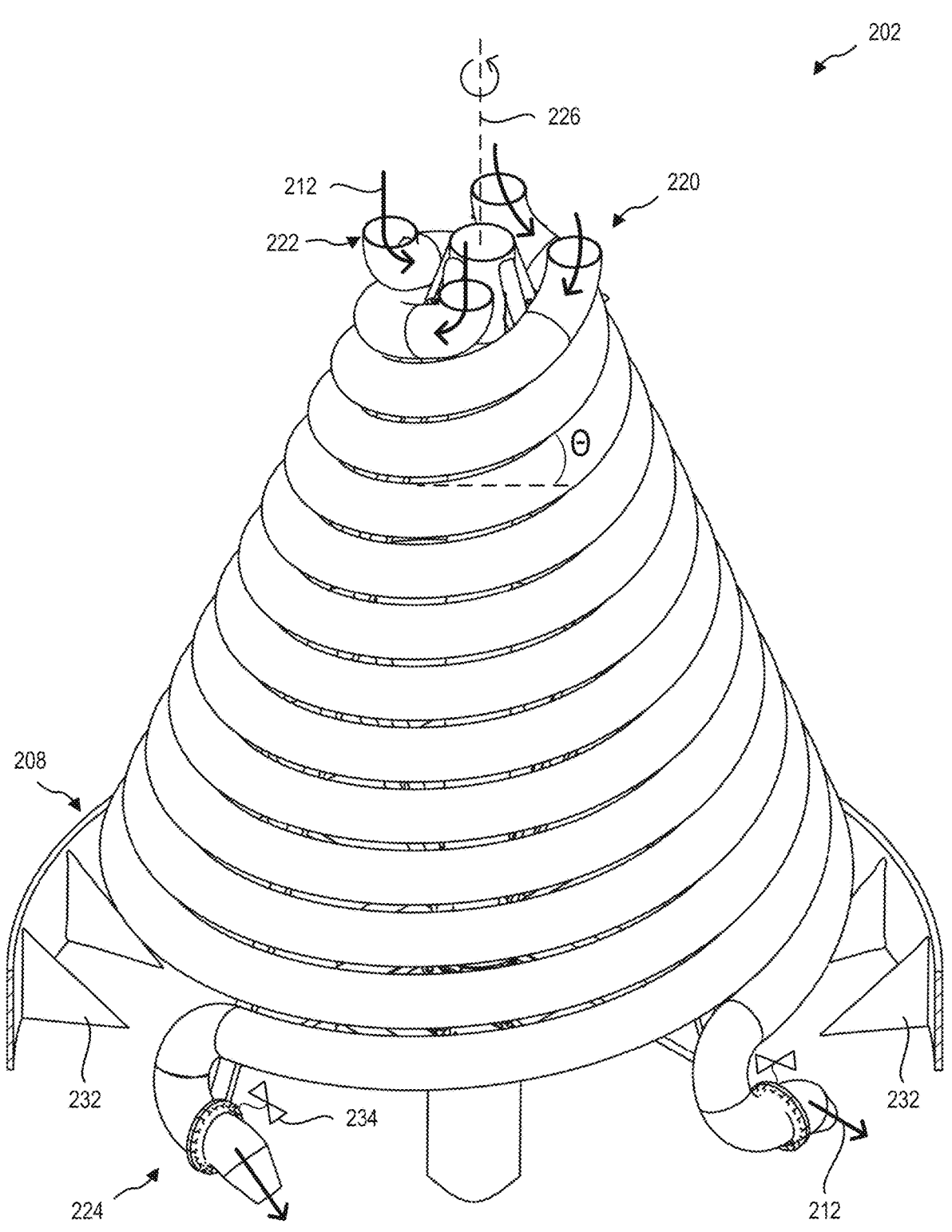
FIG. 2A is an example of a hydraulic drive as described herein, according to at least one embodiment of the present disclosure.

This disclosure generally relates to systems and methods for generating electrical energy with a unique hydraulic turbine apparatus (or simply "hydraulic turbine"). In one or more embodiments described herein, the hydraulic turbine includes a hydraulic drive and a hydraulic accumulator. The hydraulic drive additionally includes one or more helical pipes that are shaped to form a conical or cylindrical helix. In one or more implementations, the hydraulic accumulator is positioned above the hydraulic drive to provide a flow of fluid to the helical pipes.

As will be described in further detail below, fluid from a supply tank can be pumped into the hydraulic drive through a supply pipe. The fluid flows into a fluid reservoir of the hydraulic accumulator through a flow amplifier of the hydraulic accumulator. The flow amplifier rotates within the fluid reservoir and generates a vortex of the fluid within the fluid reservoir, thereby generating a pressurized flow of the fluid. The pressurized flow of the fluid then flows from the hydraulic accumulator through the helical pipes of the hydraulic drive to cause a rotation of the hydraulic drive.

In one or more implementations described herein, baffles within the helical pipes redirect the pressurized flow as it flows through the hydraulic drive, thereby applying a force to the helical pipes and imparting rotational motion to the hydraulic drive. The helical pipes have outlets through which the fluid flows and exits the hydraulic drive. The outlets may be configured and directed in an approximate opposite direction to the rotation of the hydraulic drive. In this way, thrust resulting from the flow of the fluid out of the outlets may further drive the rotation of the hydraulic drive. The hydraulic drive is coupled to a generator for converting the rotation of the hydraulic drive to an electrical energy output.

The present disclosure includes a number of practical applications that provide benefits and/or solve problems associated with generating electrical power using forces generated by a flow of water or other fluids. Some example benefits are discussed in further detail below. It will be understood that these examples are provided by way of example, and a significant number of additional benefits and practical applications are realized by features and functionalities described herein in connection with example implementations of the hydraulic turbine apparatus.

As a first example, features of the hydraulic turbine apparatus provide an efficient and low maintenance device that can generate electrical power over significant periods of time with fewer losses than many conventional hydraulic power systems. In this way, once the hydraulic turbine apparatus is powered on, the hydraulic turbine apparatus can generate power for a long period of time without supervision and without relying significantly on external power sources. For example, the hydraulic turbine apparatus includes features and functionality that enable a pump or other external apparatus to cycle on and off over periods of time to enable the hydraulic turbine apparatus to provide a consistent or continuous source of electrical power.

In addition to providing access to highly efficient power generation, the hydraulic turbine apparatus provides a closed system that does not rely on a natural flow of fluids or proximity to a natural (or artificial) body of water. Indeed, as will be discussed in connection with implementations of the hydraulic turbine apparatus below, the hydraulic turbine apparatus may be implemented over an enclosed reservoir of water (or other fluid) that can be pumped to a top of the hydraulic turbine structure, which is then reused after it passes through the helical pipes of the hydraulic turbine apparatus. This provides significant flexibility in the location and environment in which the hydraulic turbine apparatus can be implemented and provides significant benefit over conventional devices that rely heavily on proximity to natural bodies of water or otherwise significant bodies of water in order to generate electrical power.

In addition to providing an efficient and location-flexible environment, embodiments of the hydraulic turbine apparatus provide significant flexibility in the quantity of power that can be output. Indeed, as will be discussed in further detail below, the hydraulic turbine apparatus can be deployed using scalable features and physical characteristics that can be deployed across a variety of implementations. For example, in one or more embodiments, the hydraulic turbine apparatus can be deployed on a residential scale to power one or more houses or apartments. Alternatively, using many similar features, the hydraulic turbine apparatus can be deployed on a larger scale to power a significant number of buildings and/or significantly larger units depending on the demand for power within the respective deployment environments.

As illustrated in the foregoing discussion, the present disclosure utilizes a variety of terms to describe features and advantages of example implementations of the hydraulic turbine apparatus. Many of these terms and associated characteristics are discussed in further detail in connection with illustrated implementations. Additional detail will also now be provided below regarding the meaning of some of these terms.

As used herein, a "hydraulic turbine apparatus" or "hydraulic turbine" refers to a machine or system that is capable of converting potential energy and kinetic energy of water into mechanical work. The mechanical energy/work is then converted to electrical energy. In one or more embodiments described herein, the hydraulic turbine apparatus refers to a unit that is inclusive of a hydraulic drive, hydraulic accumulator, supply tank, supply pipe, and other components described herein in connection with various examples. Each of these components will be discussed in further detail in connection with various examples.

Figures 1, 3A:
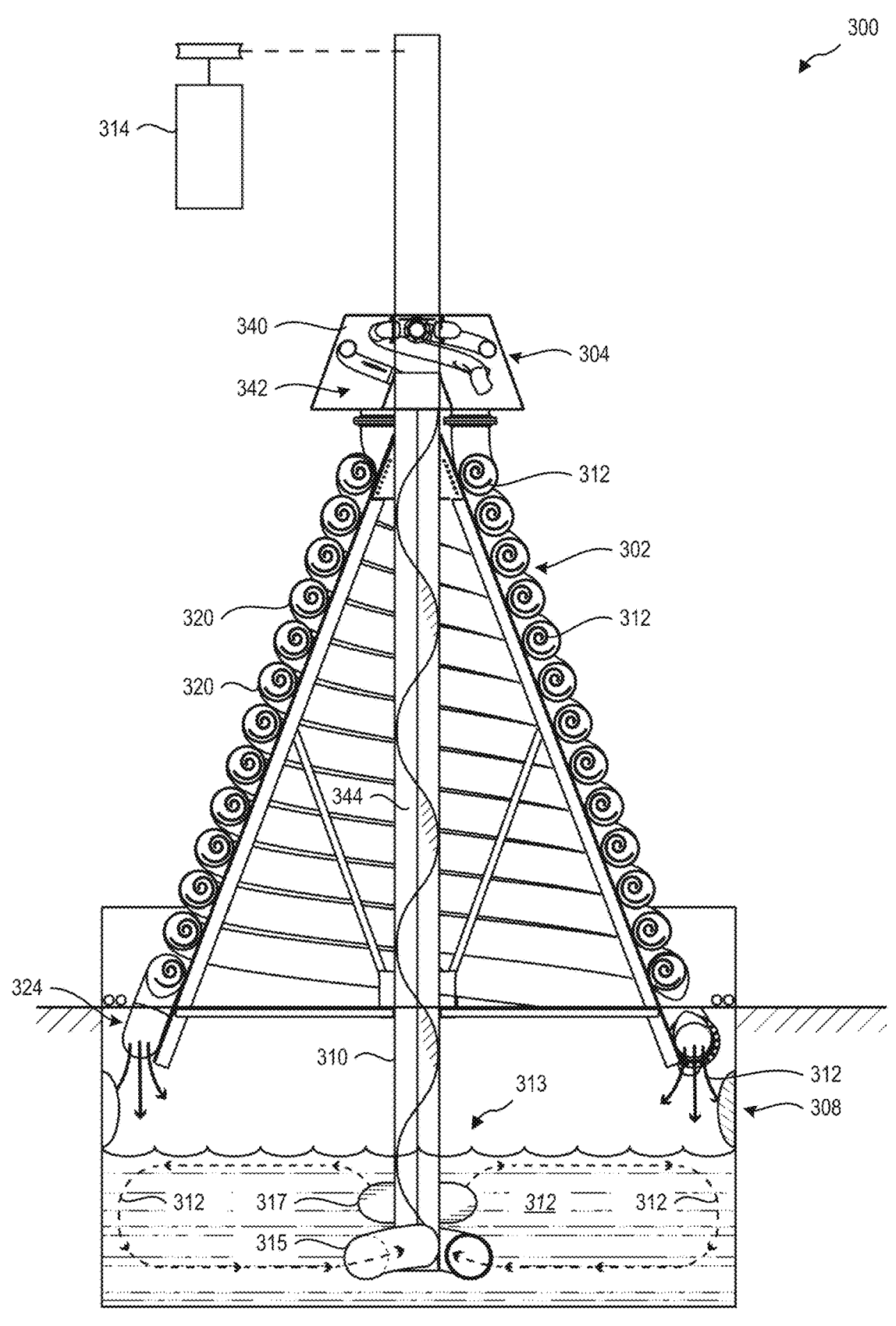

Additional detail will now be provided regarding example implementations of a hydraulic turbine apparatus and associated features and components. For example, FIG. 1 illustrates an example of a hydraulic turbine apparatus 100 (or simply, "hydraulic turbine 100"), according to at least one embodiment of the present disclosure. The hydraulic turbine 100 may be implemented as described herein for generating electricity based on a circulation and/or flow of a fluid 112, such as water, through the hydraulic turbine 100. For instance, the hydraulic turbine 100 includes a hydraulic drive 102. The hydraulic drive 102 may include one or more spiral or helical pipes through which the fluid 112 may flow. Based on the flow of fluid 112 into, through, and out of the helical pipes, the hydraulic drive 102 may be driven to rotate. A generator 106 may be rotationally coupled to the hydraulic drive 102 for capturing or converting the rotational motion of the hydraulic drive 102 into an electrical energy output. For instance, the generator 106 may be coupled to the hydraulic drive 102 with one or more of a chain, belt, shaft, gear, drive, or other motive coupling.

The hydraulic turbine 100 includes a hydraulic accumulator 104 positioned above the hydraulic drive 102. The hydraulic accumulator 104 may provide the flow of the fluid 112 to the hydraulic drive 102 for facilitating the rotational motion thereof. For example, the hydraulic accumulator 104 may receive a supply flow of the fluid 112 through a supply pipe 110 from a supply tank 108. In some embodiments, the hydraulic accumulator 104 amplifies the flow of the fluid 112 as described herein in order to provide the flow of the fluid to the hydraulic drive 102 as a pressurized flow of the fluid 112. This may facilitate an increased energy generation and/or energy efficiency of the hydraulic drive 102. The hydraulic accumulator 104 may be connected or fixed to the hydraulic drive 102 and may rotate with the hydraulic drive 102.

One or more centrifugal pumps may provide a supply flow of fluid to the hydraulic accumulator. The centrifugal pumps may have sufficient power to compensate for flow fluctuations in the hydraulic accumulator. In some cases, a helical pump as described herein is utilized to provide a supply flow. The helical pump may be connected to a reduction gearbox to reduce speed and increase torque of the helical pump as necessary to pump the supply fluid and maintain a desired flow rate. In some cases, due to the difference in rotational speed between the fluid supply in the hydraulic accumulator and the fluid flow through the hydraulic drive, additional pressure can be generated via the Bernoulli effect to facilitate the movement of the hydraulic turbine 100 as described herein.

In some embodiments, the hydraulic turbine 100 includes a supply motor 114 for driving the rotation of one or more components of the hydraulic accumulator 104 and/or for facilitating pumping the fluid 112 up the supply pipe 110 to the hydraulic accumulator. For example, a flow amplifier may be driven to rotate within the hydraulic accumulator 104 by the supply motor 114. A pump, impeller, auger, or other mechanism may be driven to rotate by the supply motor 114 to pump the fluid 112 to the hydraulic accumulator 104.

As shown in FIG. 1, the hydraulic turbine 100 includes a support structure 116. The support structure 116 may be connected to the hydraulic drive 102 and/or the hydraulic accumulator 104 for supporting and/or stabilizing these components. For example, the support structure 116 may include one or more bearings 118 for connecting to various components while also facilitating the rotation thereof of these components.

In one or more embodiments, the support structure 116 is included within the framework of the hydraulic turbine 100 based on a size of or power output of the hydraulic turbine 100. For example, in one or more implementations, the support structure 116 is included as part of the hydraulic turbine 100 when the hydraulic turbine 100 is configured to output power above a specific threshold (and correlating to a larger sized device). Alternatively, in one or more implementations, the support structure 116 is optionally removed from the framework of the hydraulic turbine 100 when the hydraulic turbine 100 is configured to output power below a specific threshold (and correlating to a smaller sized device).

Additional detail will now be discussed in connection with some of the individual components and discrete portions that make up the hydraulic turbine 100. For example, FIG. 2A is an example implementation of the hydraulic drive 202, according to at least one embodiment of the present disclosure. In some embodiments, the hydraulic drive 202 refers to an implementation of the hydraulic drive discussed above in connection with the hydraulic turbine 100 of FIG. 1 for generating electrical energy.

As shown in FIG. 2A, the hydraulic drive 202 includes a plurality of helical pipes 220. Each of the helical pipes 220 includes an inlet 222 and an outlet 224. As shown in the illustrated example, a flow of a fluid 212 may flow into the inlets 222, travel through the various turns or revolutions of the helical pipes 220 and exit the outlets 224. In one or more embodiments, the hydraulic drive 202 may receive a flow of the fluid 212 from a hydraulic accumulator connected to the hydraulic drive 202 at the inlets 222, similar to one or more embodiments described herein.

The helical pipes 220 may be implemented using a variety of dimensions, characteristics, and materials. In some embodiments the helical pipes 220 are each about 30 meters (m) in length (e.g., as measured if unwound in a straight configuration). The helical pipes 220 may be plastic, PVC, rubber, or other composite material. In some embodiments the helical pipes 220 are metal such as steel, or aluminum. The helical pipes may include a resistant or protectant property or coating, such as to protect against rust or corrosion. In some embodiments, the helical pipes are about 0.5 m in diameter. In some embodiments, the helical pipes (and the hydraulic turbine, support structure, etc.) are configured to support the weight and movement of being completely or substantially filled with a fluid 212. For example, the helical pipes 220 may be configured to contain up to 26 tons of fluid 212 flowing through the helical pipes 220, and additionally while the hydraulic drive is rotating.

In some embodiments, the fluid 212 may be water or a water-based fluid mixture. The fluid 212 may be any other liquid fluid such as glycol or other alcohol, antifreeze or other liquid coolants, salt water (e.g., seawater), or other fluid. The specific choice of fluid may be determined based on a variety of considerations including cost, efficiency, and desired flow rates. In addition, the different fluids may be determined or otherwise selected based on the materials used in the various components of the hydraulic turbine 100.

The helical pipes 220 may be positioned in a spiral configuration. For example, the helical pipes 220 may be arranged together with various layers, spirals, or turns that overlap one on top of another. In some embodiments, adjacent layers of the helical pipes 220 may be touching or a gap may exist between one or more of the layers. In some embodiments, the helical pipes 220 may spiral together in accordance with a specific shape, surface, or volume. For example, in some embodiments, the helical pipes 220 may include 4 helical pipes that may be configured as a quadruple helix. In some embodiments, the shape or form of the helical pipes 220 may be about 12 m tall and about 7 m in diameter (e.g., at the base of the helical pipes 220). For example, the helical pipes 220 may form a helical cylinder. In another example, the helical pipes 220 may form a helical cone.

In some embodiments, a cone shape of the hydraulic drive 202 may provide stability to the hydraulic drive 202. For example, in a cone shape, a larger volume of the fluid 212 within and/or flowing through the helical pipes 220 may be concentrated closer to the bottom of the hydraulic drive and/or the center of mass may be lower in a conical configuration. The helical pipes 220 may form any other shape suitable to achieve the techniques described herein. It will be appreciated that the specific shape and configuration of the helical pipes 220 may differ based on a size and weight of the hydraulic turbine 100 and/or based on the size or energy output of the apparatus.

In some embodiments the hydraulic drive 202 includes 4 helical pipes 220. The 4 helical pipes 220 may provide stability and balance to the hydraulic drive 202, such as by balancing a rotation of the hydraulic drive. The hydraulic drive 202, however, may be implemented with any number of helical pipes 220 (e.g., 1 or more). For example, power generation of the hydraulic drive 202 as described herein may be achieved with as few as 1 helical pipe 220, which may provide simplicity and ease of implementation of the hydraulic drive 202.

In some embodiments, the hydraulic drive 202 may be implemented with as many as many as 10 helical pipes 220, for example, for providing redundancy benefits and reduced wear of components. In some embodiments more helical pipes 220 may increase losses and contribute to inefficiencies of the hydraulic drive. For example, 4 helical pipes may be advantageous by providing efficiency, balance, and stability benefits without overly incurring losses. In one or more embodiments, the number and size of the helical pipes 220 may be determined based on a desired volume of fluids that may be added to the overall system. Indeed, where the helical pipes 220 may be filled prior to initiating the power generating mechanism, this provides a maximum amount of potential energy that is ready for conversion as soon as the device is activated. Thus, in one or more implementations, having additional helical pipes 220 can be advantageous by providing additional volume of fluid that is moving through the apparatus.

The helical pipes 220 may spiral in a downward direction (e.g., relative to a top surface of the hydraulic turbine 100). For example, the helical pipes 220 may be configured with a pipe angle θ orienting the helical pipes 220 at least somewhat downward or in a direction of gravity. The pipe angle θ may be a measure of the angle or tilt of the helical pipes 220 with respect to horizontal. In some embodiments the pipe angle θ may be from 14° to 16°. An angle of 14-16 degrees ensures the velocity of the hydraulic flow, while providing a shallower, longer incline, thus accommodating a greater volume of liquid and serving as a stabilizer for rotation.

In this way, the pipe angle θ (e.g., coupled with the pressurized flow of the fluid through the helical pipes 220 as described herein) may simulate the effect of the fluid 212 flowing and/or originating from a height greater than the height of the hydraulic drive 202 and/or hydraulic turbine. For example, the height of the hydraulic drive 202 from the inlets 222 to the outlets 224 may, in some implementations, be a height of 12 m, and based on the pressurized flow of fluid 212 flowing through the helical pipes 220 at the downward pipe angle θ, the flow of the fluid 212 may simulate that of a flow of the fluid 212 from as high as 30 m (i.e., the flow of the fluid 212 may exhibit the potential and/or kinetic energy of a fluid flowing or falling downward from a height of 30 m).

In some embodiments, a supply tank 208 may capture or receive the flow (e.g., outflow) of the fluid 212 from the outlets 224 of the hydraulic drive 202. For instance, the supply tank 208 may be a tank, reservoir, container or other suitable structure for collecting, storing, or otherwise containing a volume of the fluid 212. The supply tank 208 may be at least somewhat open at a top of the supply tank 208 such that the fluid 212 may flow out of the outlets 224 and into the supply tank 208. The hydraulic drive 202 may be positioned with respect to the supply tank 208, such as vertically above or over the supply tank 208. In some embodiments, the hydraulic drive 202 may be positioned partially or wholly within the supply tank 208 such that the hydraulic drive 202 may rotate partially or wholly within an interior volume of the supply tank 208.

The supply tank 208 may be substantially circular such that the hydraulic drive 202 may rotate above or partially within the supply tank 208 and such that the supply tank 208 is configured to capture the flow of the fluid 212 exiting the outlets 224. The supply tank 208 may be made of concrete, metal, plastic, any other suitable material, and combinations thereof. In some embodiments, the supply tank 208 may be positioned above a ground level, or may be positioned partly or entirely below the ground level. In this way, the flow of the fluid 212 may flow through the hydraulic drive 202 and out of the outlets 224, and may be captured and retained by the supply tank 208. The fluid 212 may flow back to the inlets 222 from the supply tank 208 via a hydraulic accumulator as described herein for recirculation through the hydraulic drive 202. For example, a supply pipe may provide a supply flow of the fluid 212 from the supply tank 208 to the hydraulic accumulator for providing the flow of the fluid 212 to the inlets 222 in order to drive a continual or prolonged rotation of the hydraulic drive 202.

The flow of the fluid 212 through the helical pipes 220 may impart a force to the hydraulic drive 202. For example, as described in connection with FIG. 2D, the helical pipes 220 may include baffles against which the flow of the fluid 212 may act, and which may apply a force to the helical pipes 220 via the baffles. As used herein, a "baffle" may refer to a structure, support, or other element of the helical pipes 220 that facilitate control of flow through the pipes.

As mentioned above, the hydraulic drive 202 may be configured to rotate. For example, the hydraulic drive 202 may be positioned or supported via one or more bearings, bushings, or other components or assemblies for facilitating the free rotation of the hydraulic drive 202. The hydraulic drive 202 may be configured to rotate about an axis 226. The axis 226 may be a longitudinal axis of the hydraulic drive 202. The hydraulic drive 202 may be driven to rotate by the forces exerted from the flow of fluid 212 (e.g., via the baffles). For example, the forces exerted on the helical pipes 220 may be offset from the axis 226 such that a torque resulting from the forces rotates the hydraulic drive 202. In some embodiments, the hydraulic drive 202 may rotate at up to 24 rotations per minute (RPM) in order to exhibit sufficient angular momentum of the dynamic weight of the fluid 212 within the hydraulic drive 202 to efficiently generate uniform, reliable, and high-quality electrical energy as described herein.

In some embodiments, the outlets 224 may be configured with jets, nozzles, or other dedicated openings for directing the fluid 212 to flow out of the outlets 224 in a particular direction, with a particular flow shape or pattern, and/or with a particular flow rate. The outflow of the fluid 212 out of the outlets 224 (e.g., out of the jets) may impart a reactive force on the hydraulic drive in an opposite direction of the outflow. For example, the outflow may have a flowrate, flow shape, acceleration, or other fluid flow property that may impart a force to the hydraulic drive 202 from and/or through the outlet 224.

Figure 2B:
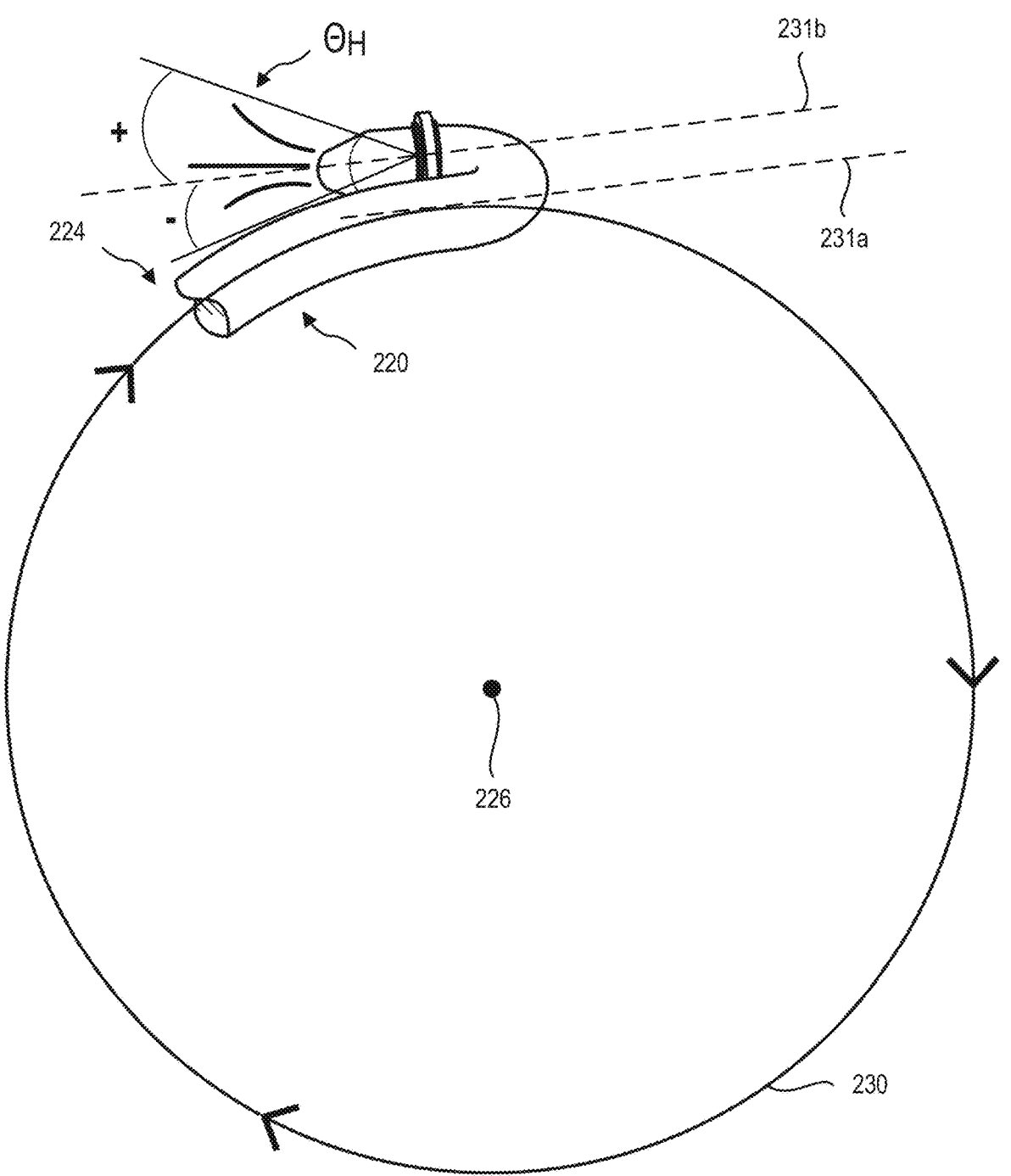
FIG. 2B is a top-down schematic view and FIG. 2C is a side schematic view of the hydraulic drive of FIG. 2A.

In some embodiments, the hydraulic drive 202 may additionally be driven to rotate based on the flow of the fluid 212 out of the outlets 224. For example, the outlets 224 may be turned, oriented, or otherwise directed in a direction that is at least partially opposite or backward from the direction of rotation of the hydraulic drive 202. For instance, the outlets 224 may be oriented with an angle that lies on a horizontal plane, such as when viewed from above. FIG. 2B illustrates a schematic diagram of the hydraulic drive 202 from a horizontal view or top-down view.

As shown in FIG. 2B, an outlet 224 may have a horizontal outlet angle $\theta_H$ that is measured with respect to a reference line 231b. The reference line 231b may be a line that intersects or passes through a center of the outlet 224 and that is parallel to (e.g., or in some cases, coincident with) a tangent line 231a of a rotational path 230 of the hydraulic drive 202. The rotational path 230 may be a rotational path that a layer of the helical pipes 220 follow, such as a bottom layer, as the hydraulic drive 202 rotates, or may be a rotational path of any other component. The tangent line 231a may be tangent to a last portion (e.g., rotationally) of the helical pipes 220 before the helical pipes 220 begin to turn in accordance with the horizontal outlet angle $\theta_H$. In some examples, the horizontal outlet angle $\theta_H$ may be 0° such that the outlet 224 is oriented aligned the reference line 231b. In some examples the horizontal outlet angle $\theta_H$ is at a positive angle from the reference line 231b, such as 45° from the reference line 231b, or any other positive angle. In some examples, the horizontal outlet angle $\theta_g$ is at a negative angle from the reference line 231b, such as −45° from the reference line 231b, or any other negative angle. In some embodiments the horizontal outlet angle $\theta_H$ being substantially aligned with (e.g., at 0° from) the reference line 231b, or substantially parallel with the tangent line 231a, may provide a larger resulting torque from the thrust of the outflow of the fluid 212 from the outlets 224, such as by maximizing a moment arm of the thrust from the axis 226. In this way, the fluid 212 may flow, spray, and/or shoot out of the outlets 224, and a horizontal component of the resulting force or thrust may be offset from the axis 226, (e.g., based on the horizontal outlet angle) which may act on the hydraulic drive 202 to further propel or drive the hydraulic drive 202 to rotate. The outlets 224 may each have the same horizontal outlet angle $\theta_H$, or one or more of the outlets 224 may have a different horizontal outlet angle $\theta_H$, such as each of the outlets 224 having a different horizontal outlet angle $\theta_H$.

Figure 2C:
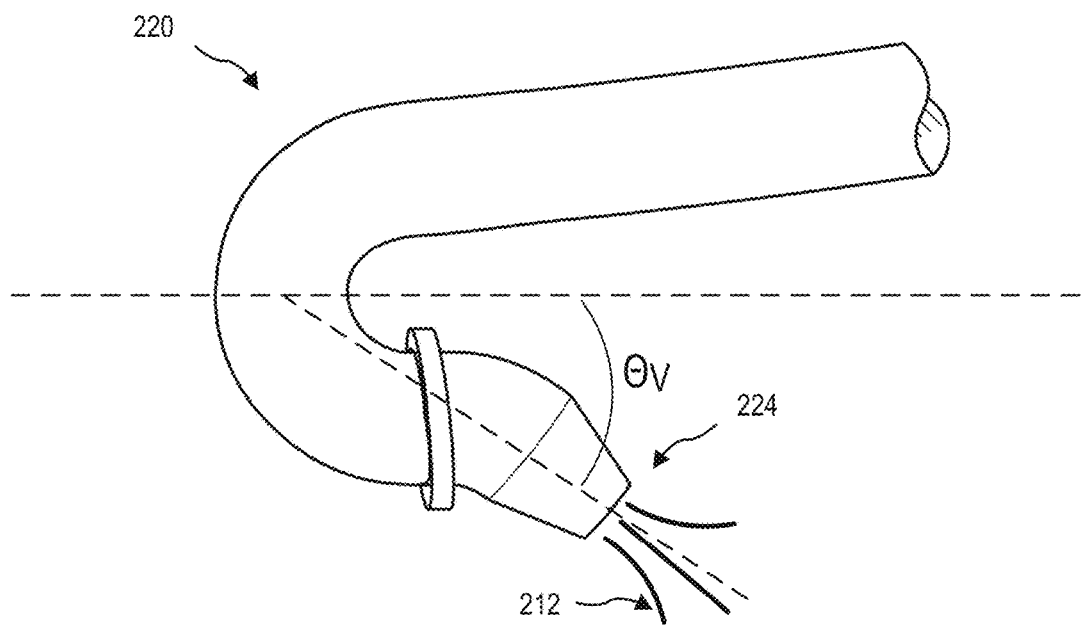

In some embodiments, the outlets 224 may be turned, oriented, or otherwise directed in a direction that is at least partially downward with respect to the hydraulic drive 202, or with respect to gravity. For example, the outlets 224 may be oriented with an angle that lies on a vertical plane, such as when viewed from a side of the hydraulic drive 202. FIG. 2C illustrates a schematic diagram of the hydraulic drive 202 from a vertical view or a side view.

As shown in FIG. 2C, the outlets 224 may have a vertical outlet angle $\theta_V$ that is measured from horizontal. In some embodiments, the vertical outlet angle $\theta_V$ is substantially 0° such that the outlets 224 are oriented substantially horizontally. In some embodiments, the vertical outlet angle $\theta_V$ is greater than 0°, such as 45° or 90° (or any value therebetween) from horizontal. In this way, the fluid 212 may flow, spray, and/or shoot out of the outlets 224, and a vertical component of the resulting force or thrust may apply at least somewhat of an upward force on the hydraulic drive 202, which may act to reduce a frictional force of the hydraulic drive 202 on the bearings or other support assemblies supporting the hydraulic drive 202.

The vertical outlet angle $\theta_V$ and vertical component of the outflow may be in addition to or as an alternative to the horizontal angle $\theta_H$ and horizontal component of the outflow. For example, the outflow of the fluid 212 out of the outlets 224 may have a vertical component and a horizontal component such that the resulting force or thrust may act to both drive the rotation of the hydraulic drive 202 as well as reduce the normal force (e.g., weight) of the hydraulic drive 202 to reduce the friction associated with the rotation of the hydraulic drive 202. In this way, the configuration and orientation of the outlets 224 may contribute to an efficiency of the hydraulic drive 202 (e.g., a hydraulic turbine in which the hydraulic drive is implemented) based on providing additional rotation and reduced friction.

Referring back to FIG. 2A, in some embodiments, the supply tank 208 may include a static impeller 232. The static impeller 232 may be implemented as fins, blades, recesses, or other structures or cavities against which the outflow of the fluid 212 out of the outlets 224 may contact and/or react in order to provide the reactive force or thrust on the hydraulic drive 202 from the outflow of the outlets 224. For example, fins (or other similar features) of the static impeller 232 may be positioned, oriented, and configured complimentary to the configuration, orientation, and/or direction of the outlets 224 as described herein such the outflow of the fluid 212 may effectively flow against the static impeller 232 and may provide a force to the hydraulic drive 202 in a specific direction or orientation, such as that described in connection with FIGS. 2B and 2C.

In some embodiments, the hydraulic drive 202 includes one or more valves 234 positioned on the helical pipes 220, for example, at or near the outlets 224. The valves 234 may control, regulate, and/or modulate the flow of the fluid 212 through and/or out of the helical pipes 220. For example, the valves 234 may change, maintain, or otherwise control a flow rate of the fluid 212 in order to operate the hydraulic drive at a desired frequency or rotational speed. In another example, the valves 234 may facilitate an initialization, startup, or commencement of the hydraulic drive 202. For example, the valves 234 may be closed in order that the helical pipes 220 may be filled partly or entirely with the fluid 212. In this way, a rotation of the hydraulic drive 202 may be imparted with some or all of the helical pipes 220 filled with the fluid 212 in order to establish an angular momentum or dynamic mass of the hydraulic drive 202 (e.g., of the rotating fluid 212 within the helical pipes 220). The valves 234 may be opened partly or entirely during initialization (e.g., to facilitate establishing the rotation) or after the hydraulic drive 202 has been brought to rotate at a given operational speed.

Figure 2D:
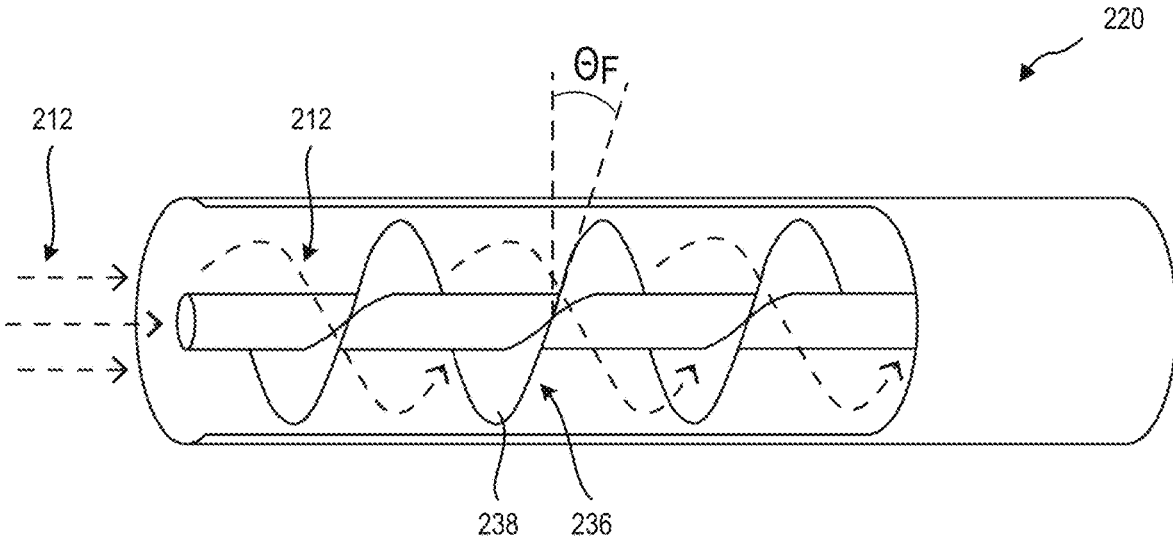
FIG. 2D is a cutaway view of a helical pipe of the hydraulic drive of FIG. 2A.

As mentioned above, the helical pipes 220 may include baffles positioned within the helical pipes 220. FIG. 2D is a cutaway view of a helical pipe of the hydraulic drive, according to at least one embodiment of the present disclosure. The helical pipe 220 may include a baffle 236 positioned within the helical pipe 220. The baffle 236 may be shaped, positioned, and configured so as to redirect the fluid path of the fluid 212 as the fluid 212 flows through the helical pipe 220. By redirecting the fluid path, the flow of the fluid 212 may impart a force on the baffle 236 which may be transferred to the helical pipe 220, thereby driving a rotation of the hydraulic drive 202 as described herein.

The baffle 236 may take any of a number of forms. For example, the baffle 236 may be one (e.g., continuous) structure or feature and/or may include one or more discontinuous structures. The baffle 236 may be any shape, configuration, or at any position so as to effectively redirect the flow of the fluid 212. For example, the baffle 236 may include one or more perforated features such that the fluid 212 may encounter the baffle and flow through the perforations. The perforations may be in various configurations such as a grid, honeycomb, or other pattern. The baffle 236 may include one or more vane features the extend diagonally or transversely within the helical pipe 220 to redirect the fluid flow. The baffle 236 may include one or more circular or annular structures, for example, concentrically within the pipe to redirect the fluid flow. The baffle 236 may include one or more spiral structures such as spiral threads, flightings, or other spiral paths to direct the fluid along a spiral path. In some embodiments, the baffle 236 may include a combination of any of these (or other) types of baffles, for example, at various parts or stages of the helical pipe 220.

In accordance with at least one embodiment of the present disclosure, the baffle 236 may take the form of a helical screw or auger within the helical pipe 220. For example, the baffle may include a continuous spiral flighting 238 extending longitudinally through the helical pipe 220. The flighting 238 may include (e.g., may be supported by) a central shaft or may be implemented without a central shaft. The flighting 238 may contact and/or connect to an inner wall of the helical pipe 220. In this way, as the fluid 212 flows through the helical pipe 220, the flighting 238 may direct the fluid 212 to flow in a spiraling manner around the various turns of the flighting 238. The baffle 236 may include a single flighting 238, for example, extending an entirety of a length of the helical pipe 220. In some embodiments the baffle 236 may include multiple discontinuous flightings 238 in multiple sections of the helical pipe 220.

In some embodiments, the flighting 238 may be oriented with a flighting angle $\theta_F$ measured from perpendicular to the helical pipe 220. The flighting angle $\theta_F$ may be between 30° and 60° (or any value therebetween). For example, the flighting angle $\theta_F$ may be 45° from perpendicular. A flighting angle $\theta_F$ of 45° may facilitate the fluid flow applying a force on the flighting 238 (and thereby the helical pipe 220) sufficient to drive the rotation of the hydraulic drive 202 while not overly restricting or redirecting the fluid flow. For example, a flighting angle $\theta_F$ of 45° may maintain the flow of the fluid 212 through the helical pipe 220 such that the fluid 212 may flow with a sufficient velocity so as to continually impart force on the flighting 238 throughout an entirety of a length of the helical pipe 220, as well as to ensure that there is sufficient spray from a jet at the outlet of the helical pipe 220 as described herein. Additionally, a flighting angle $\theta_F$ of 45° may facilitate the flow of the fluid 212 without introducing significant turbulence, eddy currents, vortices, etc., into the fluid flow.

In this way, the flow of the fluid 212 through and/or around the baffle 236 may facilitate driving the rotation of the hydraulic drive 202. As described herein, the hydraulic drive 202 may include multiple helical pipes 220. In some embodiments, each of the helical pipes 220 includes the same (e.g., type of) baffle 236. In some embodiments, one or more of the helical pipes 220 may be equipped with a different baffle. In some embodiments, one or more parts of one or more helical pipes may not include a baffle 236.

As mentioned above, the hydraulic drive 202 may be driven based on a flow of fluid through the hydraulic drive 202, which may be a pressurized flow of fluid. FIG. 3A-1 illustrates a side schematic view of a hydraulic turbine 300 having a hydraulic accumulator 304 coupled to a hydraulic drive 302 for providing a pressurized flow of fluid 312 to the hydraulic drive 302, according to at least one embodiment of the present disclosure. A described herein, the hydraulic drive 302 may include one or more helical pipes 320 through which the fluid 312 may flow in order to impart rotational motion to the hydraulic drive 302. The fluid 312 may flow out of one or more outlets 324 of the helical pipes 320 and into a supply tank 308.

The hydraulic accumulator 304 may include a fluid reservoir 340. The fluid reservoir 340 may be a tank, container, reservoir, or other structure for containing a volume of the fluid 312 in order to provide the fluid 312 to the hydraulic drive 302. The fluid reservoir may be cylindrical, conical, or any other shape. In some embodiments, the fluid reservoir 340 may be shaped similarly or complementary to a shape of the hydraulic drive 302 and/or an overall shape of the hydraulic turbine 300. For example, the hydraulic accumulator 304 may be positioned above or on top of the hydraulic drive 302 and may be formed and/or shaped in a continuous volume or shape with the hydraulic drive 302. The hydraulic accumulator 304 may be positioned above the hydraulic drive 302 such that fluid 312 may flow downward from the fluid reservoir 340 and into the helical pipes 320 of the hydraulic drive 302. In some embodiments, the fluid reservoir 340 has a volume that is at least ⅓ of the volume or capacity of the helical pipes in the hydraulic drive.

The hydraulic turbine 300 may include a supply pipe 310 for supplying the fluid reservoir 340 with a supply flow of the fluid 312 from the supply tank 308. For instance, the supply pipe 310 may have a first end positioned within the supply tank 308 and may have a second end positioned within the fluid reservoir 340. The supply pipe 310 may be positioned at a central axis of the hydraulic turbine 300, such as at a longitudinal axis or rotational axis of the hydraulic drive 302. A supply flow of the fluid 312 may flow from the supply tank 308, up the supply pipe 310 and into the fluid reservoir 340 of the hydraulic accumulator 304.

In some embodiments, the supply flow of the fluid 312 flowing up the supply pipe 310 is provided by a supply pump 313. The supply pump 313 may be connected to and/or may be a part of the supply pipe 310. In some embodiments, the supply pump 313 includes on or more intakes 315. The intakes 315 may be positioned at or near a bottom end of the supply pipe 310 and may be positioned around a circumference of the supply pipe 310. The intakes 315 may provide (e.g., or may initiate) the supply flow of the fluid 312 through the supply pipe 310. For example, the intakes 315 may be fluidly connected to the supply pipe 310, and the fluid 312 may flow through the intakes 315 and into the supply pipe 310. In some embodiments, the bottom end of the supply pipe 310 may be closed or sealed such that the fluid 312 may flow into the supply pipe 310 solely through the intakes 315.

In some embodiments, the intakes 315 may be pipes or tubes that at least partially spiral around the supply pipe 310. For example, the intakes 315 may have fluid inlets that are positioned around the supply pipe 310 and the intakes 315 may make a partial revolution around the supply pipe 310. The inlets of the intakes 315 may be 500 mm in diameter. The revolution of the intakes 315 may be directed or oriented toward the supply pipe 310 such that the intakes 315 may connect to the supply pipe 310. In some embodiments, the intakes 315 are at least somewhat angled upward as they spiral around, toward, and/or into the supply pipe 310. For instance, the intakes 315 may have an upward angle from the inlets of the intakes 315 to a point where the intakes 315 connect to or join the supply pipe 310. In some cases, the intakes 315 are angled in this way at 3° from horizontal. In some embodiments, the supply pipe 310 is fitted with several intakes 315, such as 2, 3, 4, or more intakes positioned (e.g., equidistant) around the supply pipe 310. The intakes 315 and the supply pipe 310 may function in this way as a helical pump. In some cases a difference in rotational speed between the fluid supplied by the helical pump and the hydraulic drive may generate additional pressure in the hydraulic accumulator due to the Bernoulli effect.

In some embodiments, the supply pipe 310 includes one or more or impellers 317. The impellers 317 may be positioned on the outside of the supply pipe 310 and may be positioned above the intakes 315. The impellers 317 may be fins, foils, blades, vanes, or other similar structures. The impellers 317 may have a hemispherical shape and may have a diameter of 700 mm. The impellers 317 may be angled with an angle of about 3° from horizontal, or any other angle.

In some embodiments, the impellers 317 may function to direct the fluid 312 toward the intakes 315 and/or to increase a pressure of the fluid 312 at the intakes 315. For instance, the impellers 317 may serve to at least somewhat stir, mix, or rotate the fluid 312. To elaborate, the impellers 317 may act on the fluid 312 in the supply tank 308 and may lift or urge the fluid upward from the impellers 317. The fluid 312 may flow upward and laterally outward from the impellers 317 toward a wall, perimeter, or outer extent of the supply tank 308, and may flow back toward the intakes 315 at a lower portion of the supply tank 308. In this way, the impellers 317 may generate a cyclical current or eddy from the impellers, laterally around the supply tank 308, and into or toward the intakes 315. The cyclical current of the fluid 312 in this way may be at least partially generated or directed based on a shape or geometry of the supply tank. 308. The result of this cyclical current flow of the fluid 312 may be to increase a pressure of the fluid 312 at or toward the center of the supply tank 308, such as at or near the supply pipe 310. In this way, the fluid 312 may better or more readily flow into the intakes 315, for example, with an increased pressure to facilitate the fluid 312 flowing up the supply pipe 310 and/or to increase efficiency of the supply pump 313. In some embodiments, the pressure of the fluid 312 at or flowing into the intakes 315 is 1 atmosphere (ATM).

The supply pump 313 may be fitted with a helical screw 344 or auger for pumping the supply flow of the fluid 312 up the supply pipe 310. For instance, the helical screw 344 may have one or more flightings which may make one or more continuous revolutions within the supply pipe 310. The helical screw 344 may be mounted to the supply pipe 310, for example, at an inner surface of the supply pipe 310. In some cases, the helical screw 344 may have a central shaft which may be coupled or mounted to the supply pipe 310.

In some embodiments, the supply pump 313 operates based on the supply pipe 310, and one or more of the components connected thereto, rotating in unison. For example, the supply pipe 310 may rotate, and the intakes 315 and impellers 317 may rotate to capture and/or initiate the supply flow of the fluid 312 into the supply pipe 310. Additionally, the helical screw 344 may be connected to the supply pipe 310 and may accordingly rotate with the rotation of the supply pipe 310 to pump the supply flow of the fluid 312 up the supply pipe 310. In this way, the hydraulic turbine 300 may provide the supply flow of the fluid 312 to the hydraulic accumulator 304. In some embodiments, the helical screw 344 may be driven to rotate within the supply pipe 310, for example, independent of or at a different rotational speed from that of the supply pipe 310.

In some embodiments, the supply pump 313 is driven by a supply motor 314. The supply motor 314 may be coupled to the supply pump 313, for example, by a belt, chain, shaft, gear, or any other suitable means. For instance, the supply motor 314 may be positioned at an upper portion of the hydraulic drive 300, and at least a portion of the supply pump 313 may extend upward to couple with the supply motor 314. In some embodiments, the supply motor 314 may be positioned at another location, such as below the hydraulic drive 302, at or near the supply tank 308, or another location, and accordingly may be coupled to the supply pump 313.

The supply motor 314 may drive the supply pump 313 in order to supply the fluid reservoir 340 with the supply flow of the fluid 312 from the supply tank 308. For instance, the supply motor 314 may be an electrical motor powered by an electrical grid, generator, battery, or other electrical power source. In some embodiments, the supply motor 314 may be powered at least partly by the rotational motion of the hydraulic drive 302 and/or the electrical energy output from the hydraulic drive 302. In some embodiments, the supply motor 314 may be driven at least in part (e.g., in addition to other power sources discussed herein) by natural or renewable resources, such as wind power, solar power, hydroelectric power, etc.

In some embodiments, the supply pump 313 may be connected to and may rotate with a flow amplifier 342 of a hydraulic accumulator 304 of the hydraulic turbine 300 as described herein. For example, the supply motor 314 may drive the rotation of the supply pump 313 and the flow amplifier 342. In some embodiments, the supply motor 314 includes and/or is associated with a gearbox for driving the rotation of the supply pump 313. For example, the gear box may have a gear ratio of 4.28. The supply motor 314 may operate at about 1800 RPM and about 50 kW of power. The supply motor 314 may drive the supply pump 313 to rotate at about 420 RPM.

In this way, the fluid reservoir 340 may be supplied with a supply flow of the fluid 312 from the supply tank 308. For example, the fluid reservoir 340 may be partly or completely filled with the fluid 312. The fluid reservoir 340 may provide a (e.g., pressurized) flow of the fluid 312 from the fluid reservoir 340 to the hydraulic drive 302 (e.g., to the helical pipes of the hydraulic drive 302). In some embodiments, the supply pump 313 may be operated intermittently or continually to fill and/or maintain the level of fluid 312 within the fluid reservoir 340. For example, the supply pump 313 may pump the fluid 312 from the supply tank 308 to the hydraulic accumulator 304, and the fluid 312 may flow from the hydraulic accumulator 304, through the hydraulic drive 302 and back into the supply tank 308 as a closed-loop system.

In some embodiments, the hydraulic accumulator 304 includes a flow amplifier 342. The flow amplifier 342 may be positioned within the fluid reservoir 340, and may provide the supply flow of the fluid 312 to the fluid reservoir 340. For example, the flow amplifier 342 may be coupled to the supply pipe 310 such that the supply flow of the fluid 312 flows up the supply pipe 310 and through hydrofracturing, for instance, with a hydraulic flow speed difference of 420×24, into the flow amplifier 342, and the supply flow may flow into the fluid reservoir 340 through the flow amplifier 342.

Figures 2, 3A:
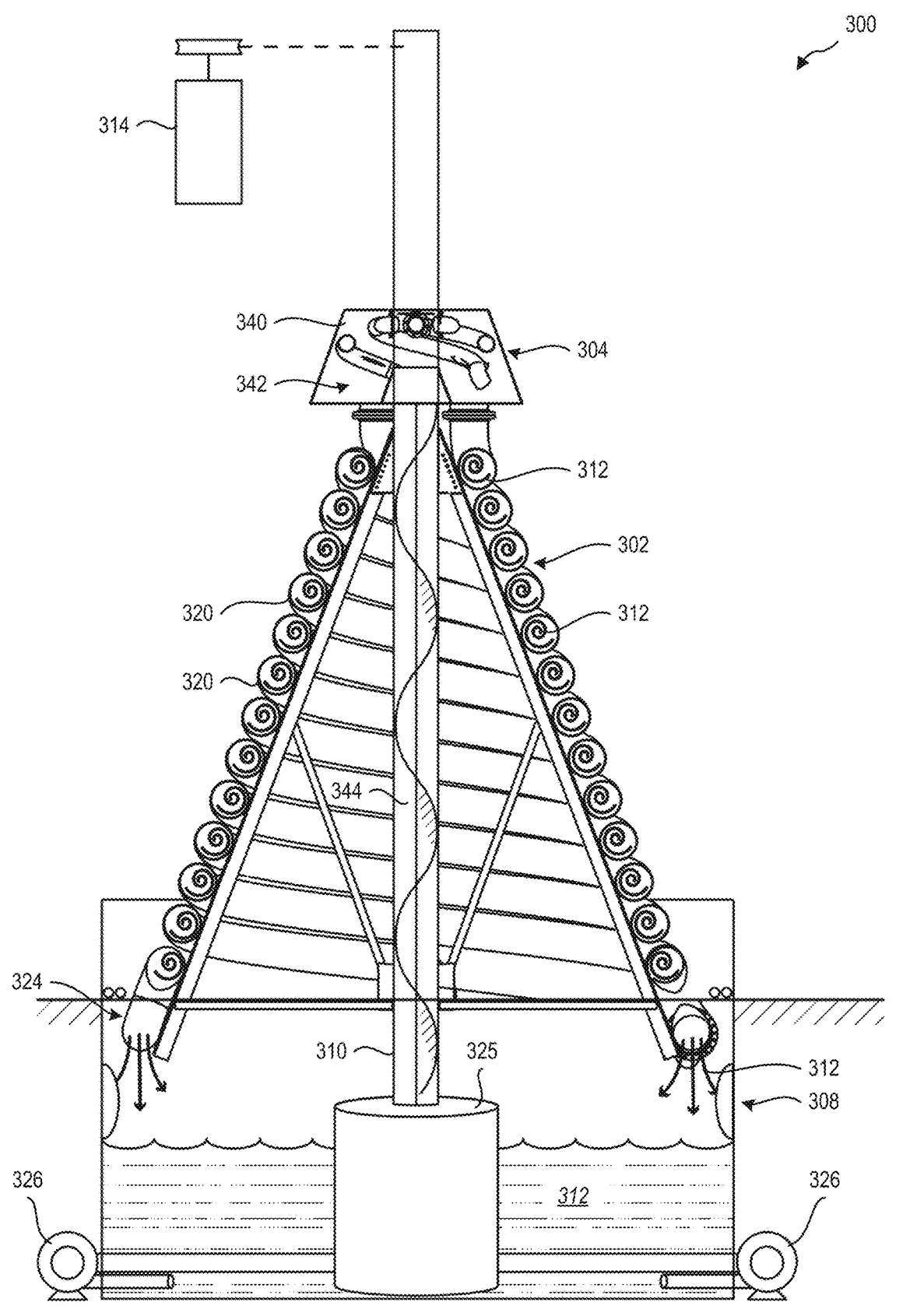

FIG. 3A-2 illustrates another side schematic view of the hydraulic turbine 300 having similar features and functionality as discussed above in connection with FIG. 3A-1. In addition, as shown in FIG. 3A-2, the hydraulic turbine 300 includes a pressure chamber 325 positioned beneath the structure of the helical screw 344 and at least partially within the reservoir 340. As further shown, the hydraulic turbine 300 includes pump structures 326 coupled to the pressure chamber 325 via tube structures. The pressure chamber 325 and pump structures 326 cooperatively pump water up a middle structure of the hydraulic turbine 300 providing water (or other fluids) to the hydraulic turbine 300 to perform energy-generating functions discussed in connection with other embodiments described herein.

Figure 3B:
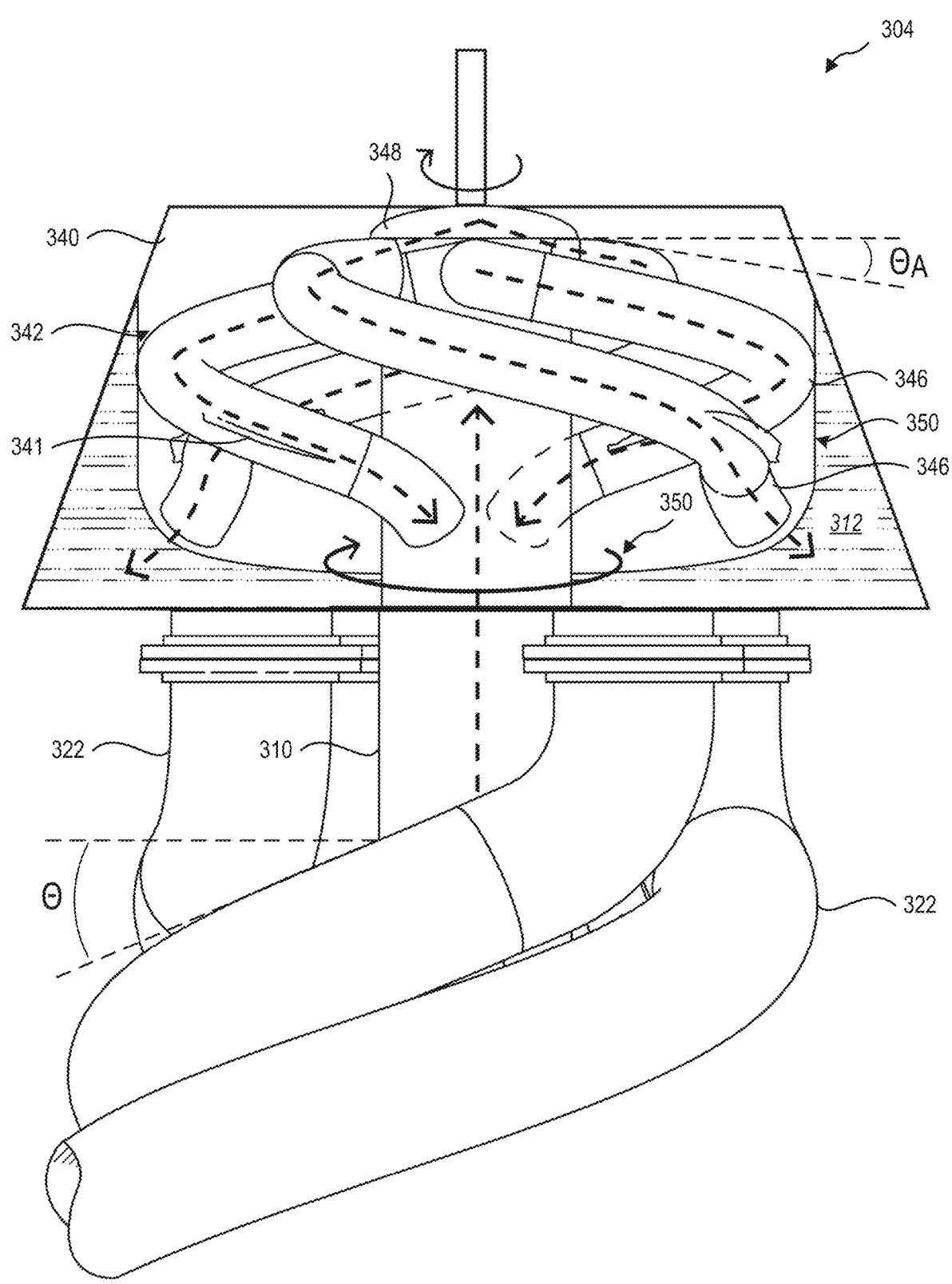
FIG. 3B is a side schematic view and FIG. 3C is a top schematic view of the hydraulic accumulator, according to at least one embodiment of the present disclosure.
Figure 3C:
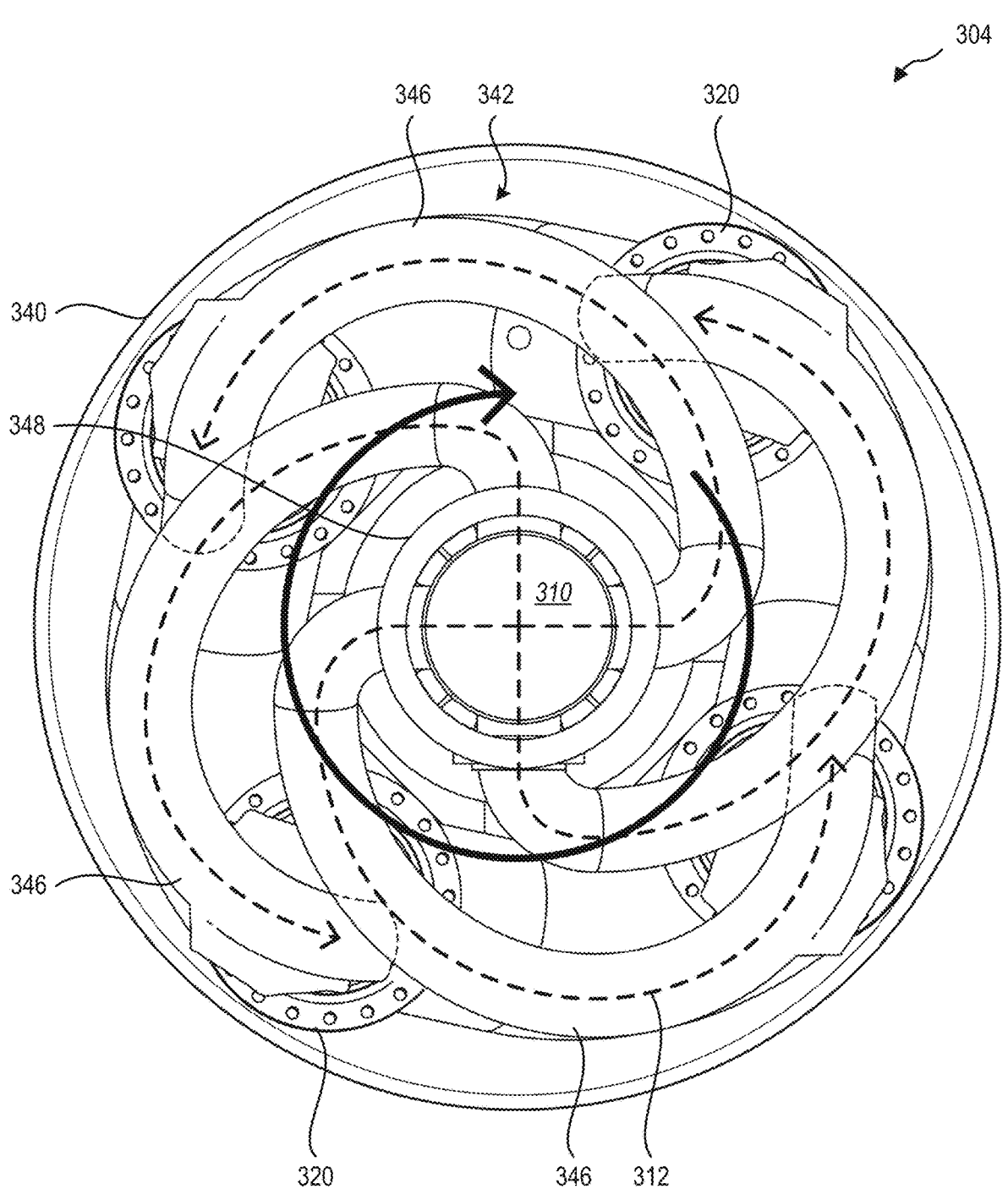

FIG. 3B is a side schematic view and FIG. 3C is a top schematic view of the hydraulic accumulator 304. The flow amplifier 342 may include one or more amplifier pipes 346. For example, the flow amplifier 342 may include any number of amplifier pipes 346, such as 1, 2, 3, 4, 5, 6, 7, 8, 9, or 10 amplifier pipes 346. In accordance with at least one embodiment of the present disclosure, the flow amplifier 342 includes 4 amplifier pipes 346. In some embodiments, the amplifier pipes 346 may be about 7 m in length. For example, the amplifier pipes 346 may spiral downward at an amplifier pipe angle $\theta_A$ of about 21°.

The flow amplifier 342 may be connected to, coupled to, and/or in fluid communication with the supply pipe 310 at an upper portion of the flow amplifier 342. For example, the amplifier pipes 346 may connect to a manifold 348 or other component at a top end of the supply pipe 310 for receiving the supply flow of the fluid 312 from the supply pipe 310. The amplifier pipes 346 may be helical pipes that extend from the manifold 348 downward in a helical or spiral configuration. For example, the amplifier pipes 346 may spiral at least partly around the supply pipe 310. In some embodiments, the amplifier pipes 346 spiral in one or more revolutions about the supply pipe 310. In some embodiments, the amplifier pipes 346 spiral in fractional revolutions about the supply pipe 310 (e.g., less than one full revolution, between one and two revolutions, etc.) The amplifier pipes 346 may be configured in a cylindrical helix configuration, a conical helix configuration, or any other shape. For instance, the amplifier pipes 346 may be configured in a shape and/or configuration that is complementary to the shape or volume of the fluid reservoir 340. The amplifier pipes 346 may curve in a direction of rotation of the flow amplifier 342, or may curve in a direction opposite that of the rotation of the flow amplifier 342.

The amplifier pipes 346 may spiral in this way in order that the supply flow of the fluid 312 flows out of the flow amplifier 342 in a somewhat lateral or sideways direction. For example, the fluid 312 may flow out of the amplifier pipes 346 at a sharp, lateral angle within the fluid reservoir 340. In some cases, the configuration of the amplifier pipes in this way may generate centrifugal force and pressure of the fluid based on the Bernoulli effect which may result in increased pressure of the fluid in the hydraulic accumulator 304. In some embodiments, the amplifier pipes 346 may extend such that the outlet(s) of the amplifier pipes 346 may be positioned near the bottom of the fluid reservoir 340, or may be positioned at any other position within the fluid reservoir 340. In some embodiments the outlet(s) of the amplifier pipes 346 may be positioned near a perimeter, circumference, or outer extent of the (e.g., bottom) of the fluid reservoir 340.

The amplifier pipes 346 being shaped, positioned, and configured in this way may facilitate generating a vortex 350 of the fluid 312 within the fluid reservoir 340. For example, the flow amplifier 342 may be configured to rotate within the fluid reservoir 340. For instance, the flow amplifier 342 may be coupled to, and driven in connection with, the supply pipe 310 and/or the supply pump 313. For example, the flow amplifier 342 may be connected to the supply pipe 310 and to one or more centrifugal pumps as described herein, which may generate the fluid flow into the hydraulic accumulator 304 in accordance with the functionality of the hydraulic accumulator as described. The flow amplifier 342 may be driven to rotate at the same or different speed as the supply pump 313. In some embodiments, the flow amplifier 342 may rotate at least at 320 rotations per minute (RPM). For example, the flow amplifier 342 may rotate at about 400-420 RPM. The rotation of the flow amplifier 342 may be independent of the rotation of the hydraulic drive 302 and/or the fluid reservoir 340 of the hydraulic accumulator 304.

The rotation of the flow amplifier 342 may cause the fluid 312 in the fluid reservoir 340 to rotate, stir, spin, or otherwise form a whirlpool or vortex 350. For example, the fluid 312 may flow (e.g., via the supply pump 313) through and out of the amplifier pipes 346 at a sharp, lateral angle within the fluid reservoir 340. The flow angle of the fluid 312 coupled with the rotation of the flow amplifier 342 may generate the vortex 350. In some cases, the flow amplifier 342 includes one or more flow structures 341, such as fins, baffles, foils, or other structure which may act to push, accelerator, or otherwise direct the fluid 312 to facilitate generating the vortex 350. In some embodiments, the vortex 350 rotates in the same direction as the rotation of the hydraulic drive 302. As mentioned above, the flow amplifier may rotate at about 420 RPM, while the hydraulic drive may rotate at a much lower speed, such as around 24 RPM. In this way, the flow amplifier 342 generating the vortex 350 forms a hydraulic reducer, increasing the pressure of the fluid flow (e.g., up to 5 ATM as described herein) and generating the pressurized flow of the fluid for providing to the hydraulic drive 302.

The rotation of the flow amplifier 342, coupled with the helical shape of the amplifier pipes 346 may generate the vortex 350, which may consume all of the fluid 312 located within the fluid reservoir 340. In some embodiments, the vortex 350 (e.g., a height of the vortex 350) may span substantially all of the height of the fluid reservoir 340. In some embodiments, the vortex 350 may span less than all of the height of the fluid reservoir 340.

As described herein, the helical pipes 320 of the hydraulic drive 302 may be connected to the hydraulic accumulator (e.g., or more specifically, to the fluid reservoir 340). For example, inlets 322 of the helical pipes 320 may be connected to the fluid reservoir 340 at a base of the fluid reservoir 340. For instance, the fluid reservoir 340 may include corresponding openings, apertures, orifices, or other openings to which the helical pipes 320 may connect, and through which the fluid 312 may flow from the fluid reservoir 340 to the helical pipes 320.

As just mentioned, the vortex 350 may facilitate providing the fluid 312 to the helical pipes 320 as a pressurized flow of the fluid 312. For example, the fluid 312 under the influence of the vortex 350 may exhibit a higher fluid pressure than the fluid 312 at rest, or not otherwise under the influence of the vortex 350. As an example, based on the centrifugal motion of the fluid 312 in the vortex 350, the fluid pressure of the fluid 312 at a radially outer extent of the vortex 350 may exhibit an increased fluid pressure. In some embodiments, the fluid pressure of the fluid 312 in the supply pipe 310 and/or at the outlets of the amplifier pipes 346 may be about 1.2 ATM. In some embodiments, the vortex 350 may increase the fluid pressure of the fluid 312 (e.g., at the outer extent of the vortex 350) to a fluid pressure of 5 ATM. In this way, the vortex 350 may facilitate generating a pressurized flow of the fluid 312 having a fluid pressure that is several times greater than a fluid pressure than the fluid 312 would otherwise exhibit. For example, the pressure of the fluid flowing into and/or through the helical pipes of the hydraulic drive may be between 3 and 10 ATM.

The helical pipes 320 may connect to the fluid reservoir 340 near a perimeter or outer extent of the base of the fluid reservoir 340, which may facilitate the helical pipes 320 receiving the pressurized flow the fluid 312 generated by the vortex 350. In some embodiments, the helical pipes 320 may connect to the fluid reservoir at a same or similar angle to the pipe angle that the helical pipes 320 exhibit in the helical configuration of the hydraulic drive 302. For example, the helical pipes 320 may connect to the fluid reservoir 340 at a pipe angle θ of 14°-16°. In some cases, the helical pipes 320 may connect to the fluid reservoir 340 at another angle (e.g., perpendicular) and may bend to orient the helical pipes 320 at the pipe angle θ. The pipe angle θ of the helical pipes 320 and the connection of the helical pipes 320 to the fluid reservoir 340 may be in the same or similar direction to the rotation of the flow amplifier 342 and/or the vortex 350. This pipe angle θ may facilitate the pressurized flow of the fluid 312 rotating around the vortex 350 within the fluid reservoir 340 and flowing into the helical pipes at a relatively small or acute angle such that the pressurized flow of the fluid 312 efficiently flows into the helical pipes 320 and is not overly constricted or interrupted. In this way, the pressurized flow may be generated within the hydraulic accumulator 304 and may be provided to the helical pipes 320 of the hydraulic drive 302 with substantially the same, increased, fluid pressure. For instance, the fluid pressure of the pressurized flow flowing throughout the helical pipes 320 may be 5 ATM.

In this way, the hydraulic accumulator 304 may provide a flow of the fluid 312 to the hydraulic drive 302 in order to drive the rotation of the hydraulic drive 302, and may also provide the flow of the fluid 312 as a pressurized flow to increase the rotational output of the hydraulic drive 302. For example, the fluid 312 flowing through the hydraulic drive 302 at a higher pressure (e.g., 5 ATM) may result in more force being exerted on the baffles of the hydraulic drive 302 as describe herein. Additionally, the higher pressure of the pressurized flow may generate more thrust as it flows out of the outlets of the hydraulic drive 302 as described herein.

As described herein, the hydraulic drive 302 may be coupled to a generator for converting the mechanical rotation of the hydraulic drive 302 into electrical energy. For example, based on the rotational speed and angular momentum (e.g., weight and rotational speed of the rotating fluid 312 within the hydraulic drive 302) the hydraulic drive 302 may be implemented to generate a significant amount of electrical energy. For instance, in accordance with at least one embodiment of the present disclosure, the hydraulic drive 302 may be implemented to generate up to 500 kW of electrical energy. As described herein, the hydraulic drive 302 may be configured to generate more or less electrical energy, such as up to 270 MW or as little as 5-7 kW. In this way, the hydraulic drive 302 (e.g., implemented as part of a hydraulic turbine as described herein) may be implemented as part of an electrical infrastructure, for example, to provide and/or augment electrical energy to an electrical power grid.

In some embodiments, the hydraulic turbine 300 may be initialized by initially filling up the hydraulic drive 302 with the fluid 312, and imparting an initial rotational motion to the hydraulic drive 302 to bring it up to a desired rotational speed. This initial rotation may be accomplished through the use of a starter motor (e.g., the generator may be used as a starter motor) and/or the fluid may be made to flow through the hydraulic drive 302 as described herein to initialize the hydraulic turbine 300. Once initialized, the hydraulic drive 302 may operate based on the flow of the fluid 312 to generate electrical energy that is uniform, high-quality and clean (e.g., a clean or pure sinusoidal signal), consistent, stable, and for an extended or prolonged period of time. For example, as described herein, a large volume and mass of fluid may be made to rotate within the hydraulic drive 302 which may have a considerable angular momentum. For instance, the hydraulic volume/mass of the fluid 312 flowing within the helical pipes 320 of the hydraulic drive 302 at a given moment (e.g., a working amount of the fluid) may be 20 times (or more) the volume/mass of fluid 312 flowing into (and out of) the hydraulic drive 302 (e.g., an input amount of the fluid). Thus, the rotation of the hydraulic drive may have a significant angular momentum and may contain a considerable amount of energy such that the hydraulic drive 302 may be stable and uniform, and may not be subject to jerks, sudden accelerations, etc.

Additionally, as described herein, the hydraulic turbine 300 may be driven to rotate based on several different modes of applied forces and torques. For example, the fluid flowing through the helical pipes 320 may generate (e.g., a bulk of the) rotation of the hydraulic drive 302, and this rotation may be augmented by the flow of the fluid out of the jets, as well as the increased fluid pressure from the hydraulic accumulator. Additionally, lift from the outflow of the fluid 312 from the jets may advantageously reduce friction on the rotating components (e.g., bearings), further increasing the efficiency of the hydraulic turbine.

In this way, the hydraulic turbine 300 may operate with an increased efficiency to convert the potential and kinetic energy of the dynamically moving fluid mass into electrical energy via the rotational movement of the hydraulic drive 302. For example, in some embodiments, the hydraulic turbine 300 may operate with a 90% efficiency, or may effectively convert 90% of the energy of the system into an electrical energy output. In some embodiments, the amount of energy required to drive the supply motor 314 (e.g., to pump the supply flow of the fluid 312 into the hydraulic accumulator 304, drive the rotation of the flow amplifier 342, etc.) and to maintain the rotation of the hydraulic drive 302 may be as little as 7% of the total energy of the total system. For instance, in some embodiments (once the hydraulic turbine 300 is initialized) the supply pump 313 may provide a supply flow of the fluid 312 to the hydraulic drive 302 of about 4 tons per second to maintain the rotation of the hydraulic drive 302, or in other words, 4 tons per second of fluid 312 may flow into and out of the hydraulic drive 302. However, upwards of 26 tons of fluid 312 may be flowing through (and rotating with) the hydraulic drive 302 at any given moment, representing a considerable amount of energy available for capturing and converting into electrical energy. Thus, the hydraulic turbine 300 may capture and output a significant amount of the system's energy while only requiring a small portion to maintain the rotation thereof.

One or more features of the hydraulic turbine(s) described herein have been described having specific dimensions, values, ranges, and other specific enumerations. It should be understood, however, that in some cases the techniques described herein may be implemented with one or more features, components, or aspects having smaller or larger configurations.

For example, in some embodiments, a hydraulic turbine in accordance with the techniques described herein may be configured for generating or outputting about 5-7 kW of electrical energy. The hydraulic drive may be configured as a conical helix of one or more (e.g., 4) helical pipes having a height of 3 m and a base diameter of 1.5 m. The helical pipes may each be 15 m in length with a diameter of about 30 centimeters (cm). The helical pipes may have a pipe angle of 14°-16°. The hydraulic turbine may operate based on the flow amplifier of the hydraulic accumulator being driven to rotate at about 420 RPM to generate a pressurized flow of fluid to provide to the hydraulic drive, which may facilitate the hydraulic drive operating at a rotation of about 24 RPM. The helical pipes may be sized and configured to hold and support about 1.5 tons of fluid flowing within and/or through the hydraulic drive at a given moment. In this way, the rotational speed and dynamic mass of the fluid within the hydraulic drive may facilitate the generation of electrical energy at about 5-7 kW based on the techniques described herein.

In another example, a hydraulic turbine in accordance with the techniques described herein may be configured for generating or outputting about 500 kW of electrical energy. The hydraulic drive may be configured as a conical helix of one or more (e.g., 4) helical pipes having a height of 12 m and a base diameter of 7 m. The helical pipes may each be 30 m in length with a diameter of about 0.5 m. The helical pipes may have a pipe angle of 14°-16°. The hydraulic turbine may operate based on the flow amplifier of the hydraulic accumulator being driven to rotate at about 420 RPM to generate a pressurized flow of fluid to provide to the hydraulic drive, which may facilitate the hydraulic drive operating at a rotation of about 24 RPM. The helical pipes may be sized and configured to hold and support about 20-26 tons of fluid flowing within and/or through the hydraulic drive at a given moment. In this way, the rotational speed and dynamic mass of the fluid within the hydraulic drive may facilitate the generation of electrical energy at about 500 kW based on the techniques described herein.

In a further example, a hydraulic turbine in accordance with the techniques described herein may be configured for generating or outputting about 270 MW of electrical energy. The hydraulic drive may be configured as a conical helix of one or more (e.g., 4) helical pipes having a height of 30 m and a base diameter of 15 m. Alternatively, the hydraulic drive may be configured as a cylindrical helix of one or more helical pipes having a height of 30 m and a diameter of 15 m. The helical pipes may each be 98 m in length with a diameter of about 1 m. The helical pipes may have a pipe angle of about 40°-44°. The hydraulic turbine may operate based on the flow amplifier of the hydraulic accumulator being driven to rotate at about 320-400 RPM to generate a pressurized flow of fluid to provide to the hydraulic drive, which may facilitate the hydraulic drive operating at a rotation of about 60 RPM. The helical pipes may be sized and configured to hold and support about 480 tons of fluid flowing within and/or through the hydraulic drive at a given moment. In this way, the rotational speed and dynamic mass of the fluid within the hydraulic drive may facilitate the generation of electrical energy at about 270 MW based on the techniques described herein.

In some cases, the supply fluid is provided to the hydraulic accumulator by various centrifugal pumps. One centrifugal pump may be connected to the supply pipe and may be positioned in (or in fluid communication with) the supply tank such that fluid is pumped up the supply pipe to the hydraulic accumulator. In some cases, another centrifugal pump is positioned at or near the hydraulic accumulator to further facilitate pumping the fluid up the supply pipe and into the hydraulic accumulator. In some cases, an electric motor drives the centrifugal pump, including a gearbox which may drive the centrifugal pumps at different speeds. The motor may operate at about 1800 RPM.

Empirical testing and analysis was performed in connection with one or more of the embodiments described herein. One or more assumptions, parameters and/or calculations are described herein. For example, in some cases, the fluid intake to the pump was considered to result from the supply pipe's rotation with attached intakes, and the influence of the impellers was excluded. In some cases, the helical screw 344 was treated as having a localized roughness, creating resistance in the boundary layer. In some cases, analysis excluded the suction effect from the amplifier pipes of the flow amplifier. In some cases, if the supply pipe has an open upper section, the supply flow may be provided such that the supply flow may reach a height of 38.6 meters with a speed of 27.5 meters per second. In some cases, if the supply pipe has an upper section that is closed, and with no spiral amplifier pipes, the supply flow is provided at a speed of 24.9 meters per second. In some cases, if the supply pipe has an upper section that is closed and has spiral amplifier pipes of about 20 mm, the supply flow is provided at 20.9 meters per section and at a flowrate of 9.02 cubic meters per second. In some cases, for example, implementations in accordance with the power and/or geometry details described herein, the hydraulic turbine may exhibit improved performance over the exemplary values, and/or metrics described herein.

Figure 4:
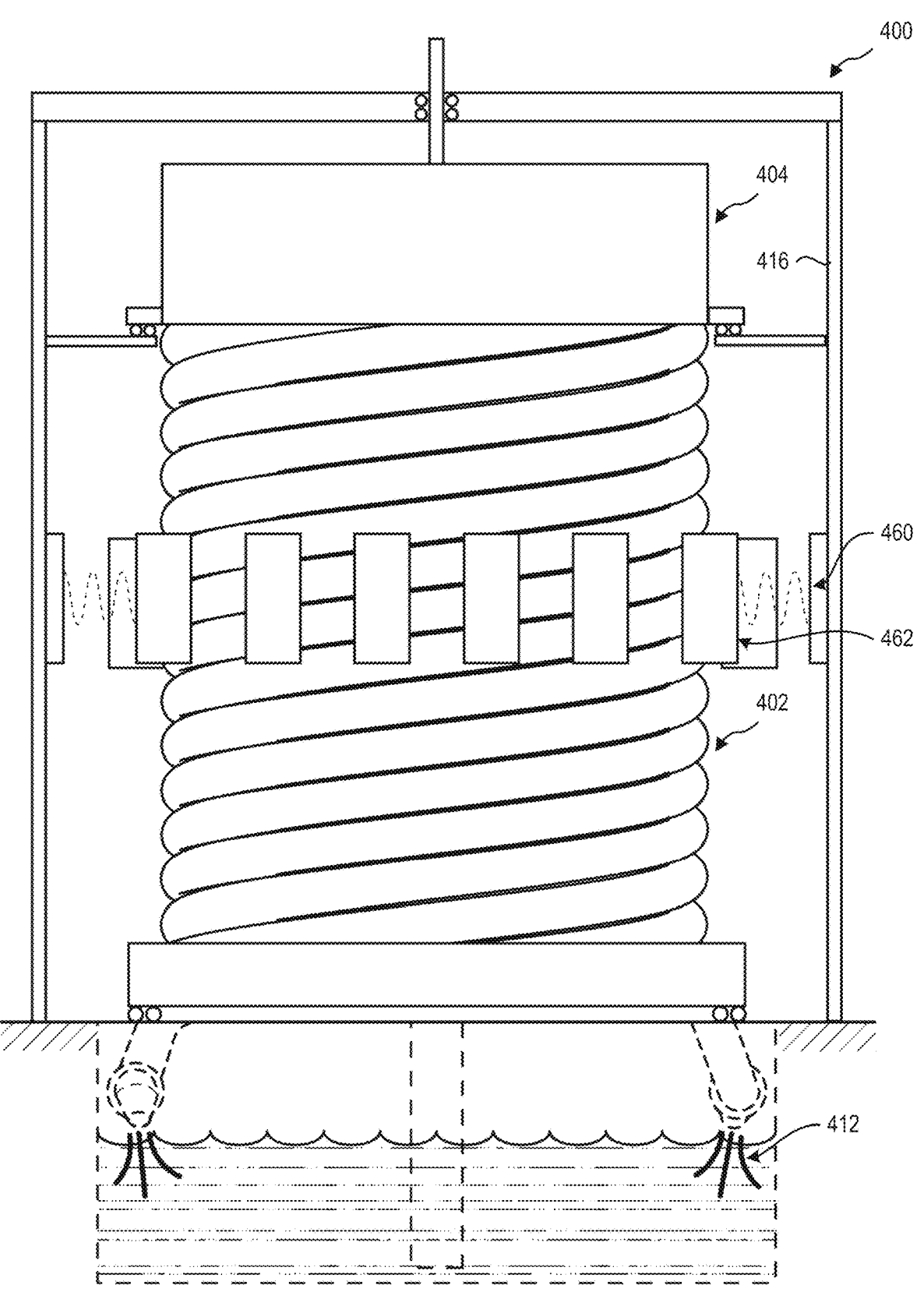
FIG. 4 is an example of a hydraulic turbine, according to at least one embodiment of the present disclosure.

FIG. 4 is an example of a hydraulic turbine 400, according to at least one embodiment of the present disclosure. The hydraulic turbine 400 may include any of the components, features, and/or functionalities of any of the hydraulic turbine(s) described herein.

The hydraulic turbine 400 may operate in substantially the same way as the hydraulic turbine(s) described herein. For example, the hydraulic turbine 400 includes a hydraulic accumulator 404 for generating and providing a pressurized flow of a fluid 412 to a hydraulic drive 402. Based on the fluid flowing through and out of the hydraulic drive 402, the hydraulic drive may be made to rotate. The rotation of the hydraulic drive 402, and more specifically, the energy of the rotating mass of the hydraulic drive 402 by virtue of the fluid within the hydraulic drive 402, may be harnessed, collected, or otherwise converted into electrical energy. For example, rather than being coupled to a generator for generating electrical energy, as described in one or more embodiments herein, the hydraulic turbine 400 may be integrated directly with an electrical energy generating mechanism.

In some embodiments, the hydraulic drive 402 may be configured with a stator 460 and an rotor 462. The stator 460 may be connected to a support structure 416 of the hydraulic turbine 400 and may be fixed in place relative to the hydraulic drive 402. The stator 460 may substantially surround some or all of (e.g., a circumference) of the hydraulic drive 402). The rotor 462 may be connected to the hydraulic drive 402 and may rotate with the hydraulic drive 402. In this way, the rotor 462 may be made to rotate past, or within the stator 460 in a similar manner to that of an electric motor or generator. For example, the stator 460 and/or the rotor 462 may include magnets, field windings, coils, armature, and other components for generating electricity based on the movement/rotation of the armature 462 within the stator 460, as in an electric motor. In this way, the hydraulic drive 402 may function as a rotor of an electric motor, and the hydraulic turbine 400 may itself be a generator for generating electricity, for example, instead of being coupled to an (e.g., external) generator. In some embodiments, the hydraulic turbine 400 may include or may be coupled to a generator for generating electricity based on the rotation of the hydraulic drive 402, for example, in addition to including the integrated stator 460 and rotor 462 components.

Figure 5:
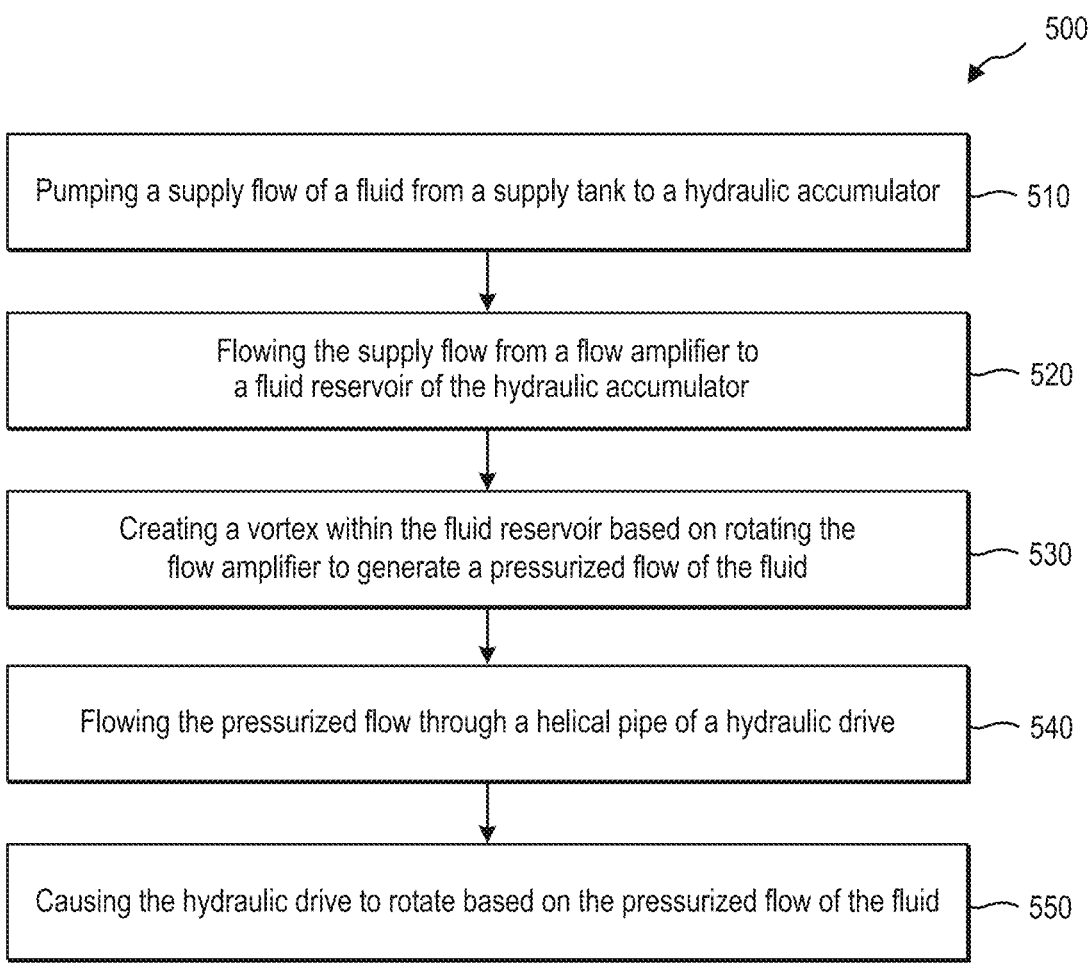
FIG. 5 illustrates a flow diagram for a method or a series of acts for operating a hydraulic turbine as described herein, according to at least one embodiment of the present disclosure.

FIG. 5 illustrates a flow diagram of a method 500 or a series of acts for operating a hydraulic turbine as described herein, according to at least one embodiment of the present disclosure. While FIG. 5 illustrates acts according to one embodiment, alternative embodiments may add to, omit, reorder, or modify any of the acts of FIG. 5.

In some embodiments, the method 500 includes an act 510 of pumping a supply flow of a fluid from a supply tank to a hydraulic accumulator through a supply pipe.

In some embodiments, the method 500 includes an act 520 of flowing the supply flow from a flow amplifier of the hydraulic accumulator to a fluid reservoir of the hydraulic accumulator.

In some embodiments, the method 500 includes an act 530 of creating a vortex of the fluid within the fluid reservoir based on rotating the flow amplifier to generate a pressurized flow of the fluid. In some embodiments, the supply flow is pumped to the hydraulic accumulator through the supply pipe by a supply pump of the supply pipe, and the supply pump is driven based on rotating the flow amplifier.

In some embodiments, the method 500 includes an act 540 of flowing the pressurized flow through a plurality of turns of a helical pipe of a hydraulic drive. For example, the pressurized flow may flow through helical pipe at a downward angle of 14° to 16° of the helical pipe. In some embodiments, the pressurized flow is flowed through an outlet of the helical pipe in a direction that is at least somewhat opposite a direction of rotation of the hydraulic drive to further cause the hydraulic drive to rotate.

In some embodiments, the method 500 includes an act 550 of causing the hydraulic drive to rotate based on the pressurized flow of the fluid flowing through the hydraulic drive. In some embodiments, the hydraulic drive may rotate at no less than 24 RPM and the flow amplifier may rotate at no less than 320 RPM. In some embodiments, an electrical energy output may be generated based on causing the hydraulic drive to rotate.

The following description from section A1 to section C9 includes various embodiments that, where feasible, may be combined in any permutation. For example, the embodiment of section A1 may be combined with any or all embodiments of the following sections. Embodiments that describe acts of a method may be combined with embodiments that describe, for example, systems and/or devices. Any permutation of the following paragraphs is considered to be hereby disclosed for the purposes of providing "unambiguously derivable support" for any claim amendment based on the following paragraphs. Furthermore, the following paragraphs provide support such that any combination of the following paragraphs would not create an "intermediate generalization."

A1. A hydraulic turbine for generating electrical power based on a flow of a fluid, comprising:

a hydraulic drive including at least one helical pipe configured for a pressurized flow of the fluid to flow through the at least one helical pipe and impart rotational motion to the hydraulic drive;

a hydraulic accumulator positioned at an upper portion of the hydraulic turbine, the hydraulic accumulator including a fluid reservoir and a flow amplifier configured to rotate within the fluid reservoir to generate the pressurized flow within the fluid reservoir from a supply flow of the fluid provided to the fluid reservoir;

a supply tank positioned at a base of the hydraulic turbine; and a supply pipe configured to provide the supply flow to the hydraulic accumulator.

A2. The hydraulic turbine of A1, wherein the hydraulic drive includes four helical pipes.

A3. The hydraulic turbine of A1 or A2, wherein the supply pipe is positioned at a rotational axis of the hydraulic drive.

A4. The hydraulic turbine of any of A1-A3, wherein the fluid reservoir of the hydraulic accumulator is connected to the hydraulic drive.

A5. The hydraulic turbine of any of A1-A4, wherein the hydraulic drive is configured to rotate at about twenty-four rotations per minute (RPM).

A6. The hydraulic turbine of any of A1-A5, wherein the flow amplifier is configured to rotate at about four hundred twenty rotations per minute (RPM) within the fluid reservoir.

A7. The hydraulic turbine of any of A1-A6, further comprising a support structure for supporting the hydraulic drive, wherein the hydraulic drive is connected to the support structure through one or more bearings connected to a bottom surface of the hydraulic drive.

A8. The hydraulic turbine of A7, wherein the hydraulic accumulator is connected to the support structure through one or more additional bearings.

A9. The hydraulic turbine of A7 or A8, wherein the support structure includes a stator positioned around the hydraulic drive, and the hydraulic drive includes an armature positioned within the stator and configured to rotate within the stator to generate electricity.

A10. The hydraulic turbine of any of A1-A9, wherein the hydraulic drive is positioned over the supply tank such that an outlet of the at least one helical pipe is configured to conduct the fluid from within the at least one helical pipe to the fluid reservoir.

A11. The hydraulic turbine of any of A1-A10, wherein the supply pipe includes a supply pump for pumping the supply flow from the supply tank, through the supply pipe, and to the fluid reservoir of the hydraulic accumulator.

A12. The hydraulic turbine of A11, further comprising a supply motor for driving the rotation of the flow amplifier.

A13. The hydraulic turbine of any of A1-A12, further comprising an electrical generator rotationally coupled to the hydraulic drive for generating electricity based on the rotational motion of the hydraulic drive.

A14. The hydraulic turbine of any of A1-A13, wherein the supply tank includes a static impeller positioned around a perimeter of the supply tank.

A15. The hydraulic turbine of any of A1-A14, wherein the at least one helical pipe is configured to flow a working amount of the fluid within the at least one helical pipe that is at least 20 times more than an input amount of the fluid to the at least one helical pipe.

B1. A hydraulic drive for rotating based on a flow of fluid, comprising:

at least one helical pipe having an angle from 14° to 16° from horizontal;

an inlet at a top of the at least one helical pipe for receiving the flow of fluid;

an outlet at a bottom of the at least one helical pipe for flowing the flow of fluid out of the at least one helical pipe; and a baffle positioned within the at least one helical pipe configured to change a direction of the flow of fluid within the at least one helical pipe to impart a rotational motion of the hydraulic drive.

B2. The hydraulic drive of B1, wherein the baffle includes a spiral flighting positioned within the at least one helical pipe.

B3. The hydraulic drive of B1 or B2, wherein the at least one helical pipe is in the shape of a helical cone.

B4. The hydraulic drive of any of B1-B3, wherein the hydraulic drive includes four helical pipes positioned as a quadruple helix.

B5. The hydraulic drive of any of B1-B4, wherein the outlet is directed in a direction that is approximately opposite a direction of the rotational motion of the hydraulic drive in order for the flow of fluid to flow out of the at least one helical pipe at least somewhat opposite the direction of the rotational motion of the hydraulic drive to impart at least some of the rotational motion to the hydraulic drive.

B6. The hydraulic drive of any of B1-B5, wherein the outlet is directed at least somewhat in a downward direction in order for the flow of fluid to flow out of the at least one helical pipe to apply an upward force on the hydraulic drive.

C1. A hydraulic accumulator for generating a pressurized flow of a fluid, comprising:

a fluid reservoir;

a flow amplifier connected to a supply pipe and config-
ured to rotate within the fluid reservoir to generate the
pressurized flow;
a supply motor for driving a rotation of the flow amplifier;
and
an outlet at a base of the fluid reservoir configured to flow
the pressurized flow of the fluid out of the fluid reser-
voir.

C2. The hydraulic accumulator of C1, wherein the flow
amplifier includes at least one amplifier pipe connected to
the supply pipe.

C3. The hydraulic accumulator of C 2, wherein the at least
one amplifier pipe is configured to flow a supply flow of the
fluid from the supply pipe and into the fluid reservoir while
the flow amplifier is rotating.

C4. The hydraulic accumulator of C2 or C3, wherein the at
least one amplifier pipe is one or more of:
curved in a direction of rotation of the flow amplifier;
angled downward; or
a shape of a conical helix.

C5. The hydraulic accumulator of any of C1-C4, wherein the
flow amplifier is configured to rotate within the fluid reser-
voir to generate a vortex within the fluid reservoir when the
fluid reservoir is at least partially filled with the fluid.

C6. The hydraulic accumulator of any of C1-C5, wherein the
flow amplifier includes four amplifier pipes.

C7. The hydraulic accumulator of any of C1-C6, wherein the
flow amplifier is connected to an impeller of the supply pipe
to pump a supply of the fluid up the supply pipe and into the
flow amplifier.

C8. The hydraulic accumulator of any of C1-C7, wherein the
fluid reservoir is conical.

C9. The hydraulic accumulator of any of C1-C8, wherein the
outlet is oriented at an acute angle from a direction of
rotation of the flow amplifier.

One or more specific embodiments of the present disclo-
sure are described herein. These described embodiments are
examples of the presently disclosed techniques. Addition-
ally, in an effort to provide a concise description of these
embodiments, not all features of an actual embodiment may
be described in the specification. It should be appreciated
that in the development of any such actual implementation,
as in any engineering or design project, numerous embodi-
ment-specific decisions will be made to achieve the devel-
opers' specific goals, such as compliance with system-
related and business-related constraints, which may vary
from one embodiment to another. Moreover, it should be
appreciated that such a development effort might be com-
plex and time consuming, but would nevertheless be a
routine undertaking of design, fabrication, and manufacture
for those of ordinary skill having the benefit of this disclo-
sure.

Additionally, it should be understood that references to
"one embodiment" or "an embodiment" of the present
disclosure are not intended to be interpreted as excluding the
existence of additional embodiments that also incorporate
the recited features. For example, any element described in
relation to an embodiment herein may be combinable with
any element of any other embodiment described herein.
Numbers, percentages, ratios, or other values stated herein
are intended to include that value, and also other values that
are "about" or "approximately" the stated value, as would be
appreciated by one of ordinary skill in the art encompassed
by embodiments of the present disclosure. A stated value
should therefore be interpreted broadly enough to encom-
pass values that are at least close enough to the stated value
to perform a desired function or achieve a desired result. The stated values include at least the variation to be expected in
a suitable manufacturing or production process, and may
include values that are within 5%, within 1%, within 0.1%,
or within 0.01% of a stated value.

A person having ordinary skill in the art should realize in
view of the present disclosure that equivalent constructions
do not depart from the spirit and scope of the present
disclosure, and that various changes, substitutions, and
alterations may be made to embodiments disclosed herein
without departing from the spirit and scope of the present
disclosure. Equivalent constructions, including functional
"means-plus-function" clauses are intended to cover the
structures described herein as performing the recited func-
tion, including both structural equivalents that operate in the
same manner, and equivalent structures that provide the
same function. It is the express intention of the applicant not
to invoke means-plus-function or other functional claiming
for any claim except for those in which the words 'means
for' appear together with an associated function. Each
addition, deletion, and modification to the embodiments that
falls within the meaning and scope of the claims is to be
embraced by the claims.

The terms "approximately," "about," and "substantially"
as used herein represent an amount close to the stated
amount that is within standard manufacturing or process
tolerances, or which still performs a desired function or
achieves a desired result. For example, the terms "approxi-
mately," "about," and "substantially" may refer to an
amount that is within less than 5% of, within less than 1%
of, within less than 0.1% of, and within less than 0.01% of
a stated amount. Further, it should be understood that any
directions or reference frames in the preceding description
are merely relative directions or movements. For example,
any references to "up" and "down" or "above" or "below"
are merely descriptive of the relative position or movement
of the related elements. Additionally, as used herein, the
term "and/or" includes any and all combinations of one or
more of the associated listed items.

The present disclosure may be embodied in other specific
forms without departing from its spirit or characteristics.
The described embodiments are to be considered as illus-
trative and not restrictive. The scope of the disclosure is,
therefore, indicated by the appended claims rather than by
the foregoing description. Changes that come within the
meaning and range of equivalency of the claims are to be
embraced within their scope.

What is claimed is:

1. A hydraulic turbine for generating electrical power
based on a flow of a fluid, comprising:
a hydraulic drive including at least one helical pipe
configured for a pressurized flow of the fluid to flow
through the at least one helical pipe and impart rota-
tional motion to the hydraulic drive;
a hydraulic accumulator positioned at an upper portion of
the hydraulic turbine, the hydraulic accumulator
including a fluid reservoir and a flow amplifier config-
ured to rotate within the fluid reservoir to generate the
pressurized flow within the fluid reservoir from a
supply flow of the fluid provided to the fluid reservoir;
a supply tank positioned at a base of the hydraulic turbine;
a supply pipe configured to provide the supply flow to the
hydraulic accumulator; and
a baffle positioned within the at least one helical pipe
configured to change a direction of the pressurized flow
of the fluid within the at least one helical pipe to at least
partially impart the rotational motion to the hydraulic
drive.

2. The hydraulic turbine of claim 1, wherein the fluid reservoir of the hydraulic accumulator is connected to the hydraulic drive.

3. The hydraulic turbine of claim 1, wherein the hydraulic drive is configured to rotate at about twenty-four rotations per minute (RPM) and the flow amplifier is configured to rotate at about four hundred twenty RPM within the fluid reservoir.

4. The hydraulic turbine of claim 1, further comprising a support structure for supporting the hydraulic drive, wherein the hydraulic drive is connected to the support structure through one or more bearings connected to a bottom surface of the hydraulic drive and wherein the hydraulic accumulator is connected to the support structure through one or more additional bearings.

5. The hydraulic turbine of claim 4, wherein the support structure includes a stator positioned around the hydraulic drive, and the hydraulic drive includes an armature positioned within the stator and configured to rotate within the stator to generate electricity.

6. The hydraulic turbine of claim 1, wherein the hydraulic drive is positioned over the supply tank such that an outlet of the at least one helical pipe is configured to conduct the fluid from within the at least one helical pipe to the supply tank, and the supply tank includes a static impeller positioned around a perimeter of the supply tank.

7. The hydraulic turbine of claim 1, wherein the supply pipe includes a supply pump for pumping the supply flow from the supply tank, through the supply pipe, and to the fluid reservoir of the hydraulic accumulator.

8. The hydraulic turbine of claim 7, further comprising a supply motor for driving the rotation of the flow amplifier.

9. The hydraulic turbine of claim 1, further comprising an electrical generator rotationally coupled to the hydraulic drive for generating electricity based on the rotational motion of the hydraulic drive.

10. The hydraulic turbine of claim 1, wherein the at least one helical pipe is configured to flow a working amount of the fluid within the at least one helical pipe that is at least 20 times more than an input amount of the fluid to the at least one helical pipe.

11. The hydraulic turbine of claim 1, wherein the hydraulic drive includes:

the least one helical pipe having an angle from 14° to 16° from horizontal;

an inlet at a top of the at least one helical pipe for receiving the pressurized flow of the fluid; and an outlet at a bottom of the at least one helical pipe for flowing the pressurized flow of the fluid out of the at least one helical pipe.

12. The hydraulic turbine of claim 11, wherein the hydraulic accumulator includes:

a supply motor for driving a rotation of the flow amplifier; and an outlet at a base of the fluid reservoir configured to flow the pressurized flow of the fluid out of the fluid reservoir and to the at least one helical pipe of the hydraulic drive.

13. A hydraulic drive for rotating based on a flow of fluid, comprising:

at least one helical pipe having an angle from 14° to 16° from horizontal;

an inlet at a top of the at least one helical pipe for receiving the flow of fluid;

an outlet at a bottom of the at least one helical pipe for flowing the flow of fluid out of the at least one helical pipe; and a baffle positioned within the at least one helical pipe configured to change a direction of the flow of fluid within the at least one helical pipe to impart a rotational motion of the hydraulic drive.

14. The hydraulic drive of claim 13, wherein the baffle includes a spiral flighting positioned within the at least one helical pipe.

15. The hydraulic drive of claim 13, wherein the hydraulic drive includes four helical pipes positioned as a quadruple helix in the shape of a helical cone.

16. The hydraulic drive of claim 13, wherein:

the outlet is directed in a direction that is approximately opposite a direction of the rotational motion of the hydraulic drive in order for the flow of fluid to flow out of the at least one helical pipe at least somewhat opposite the direction of the rotational motion of the hydraulic drive to impart at least some of the rotational motion to the hydraulic drive; and the outlet is directed at least somewhat in a downward direction in order for the flow of fluid to flow out of the at least one helical pipe to apply an upward force on the hydraulic drive.

17. A hydraulic accumulator for generating a pressurized flow of a fluid, comprising:

a fluid reservoir;

a flow amplifier connected to a supply pipe and configured to rotate within the fluid reservoir to generate the pressurized flow;

a supply motor for driving a rotation of the flow amplifier; and an outlet at a base of the fluid reservoir configured to flow the pressurized flow of the fluid out of the fluid reservoir, wherein the flow amplifier includes at least one amplifier pipe connected to the supply pipe and configured to flow a supply flow of the fluid from the supply pipe and into the fluid reservoir while the flow amplifier is rotating, wherein the flow amplifier is configured to rotate within the fluid reservoir to generate a vortex within the fluid reservoir when the fluid reservoir is at least partially filled with the fluid, and wherein the flow amplifier is connected to an impeller of the supply pipe to pump a supply of the fluid up the supply pipe and into the flow amplifier.

18. The hydraulic accumulator of claim 17, wherein the at least one amplifier pipe includes 4 amplifier pipes that are one or more of:

curved in a direction of rotation of the flow amplifier;

angled downward; or a shape of a conical helix.

19. The hydraulic accumulator of claim 17, wherein the fluid reservoir is conical and the outlet is oriented at an acute angle from a direction of rotation of the flow amplifier.

* * * * *